US006956865B1

(12) United States Patent
Khaunte et al.

(10) Patent No.: US 6,956,865 B1
(45) Date of Patent: Oct. 18, 2005

(54) TECHNIQUE FOR DYNAMICALLY ADJUSTING LOOKAHEAD TIME FOR CHANNEL MAP MESSAGES TO ACHIEVE OPTIMAL PACKET PERFORMANCE OVER AN ACCESS NETWORK

(75) Inventors: Sunil Khaunte, Santa Clara, CA (US); Guenter Roeck, San Jose, CA (US); Chrisanto Leano, San Jose, CA (US); Son Nguyen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/479,433

(22) Filed: Jan. 7, 2000

(51) Int. Cl.⁷ .............................................. H04B 7/212
(52) U.S. Cl. ...................... 370/442; 370/508; 370/345
(58) Field of Search ............................... 370/230, 235, 370/329, 431, 458, 503, 508, 345, 442, 498, 370/330

(56) References Cited

U.S. PATENT DOCUMENTS

| | | |
|---|---|---|
| 5,862,451 A | 1/1999 | Grau et al. |
| 5,943,604 A | 8/1999 | Chen et al. |
| 6,181,716 B1 * | 1/2001 | Lide ........................... 370/519 |
| 6,430,193 B1 * | 8/2002 | Raissinia et al. ........... 370/448 |
| 6,490,727 B1 * | 12/2002 | Nazarathy et al. .......... 725/129 |
| 6,643,295 B1 * | 11/2003 | Nose ........................... 370/442 |

OTHER PUBLICATIONS

"Data-Over-Cable Service Interface Specifications Radio Frequency Interface Specfilication SP-RFIv1.1-102-990731," Jul. 31, 1999, Cable Television Laboratories, Inc., pp. 3, 13, 75, 78, 103-104, 108, and 110-111.*
Data Over Cable Service Interface Specifications, Radio Frequency Interface Specification, SP-RFIv1.1-102-990731, 333 Pages, 1999.

* cited by examiner

*Primary Examiner*—Ricky Ngo
*Assistant Examiner*—Nittaya Juntima
(74) *Attorney, Agent, or Firm*—Beyer Weaver & Thomas, LLP

(57) ABSTRACT

A technique is described for improving packet performance in an access network. The access network comprises a Head End and a plurality of nodes. The access network further includes at least one shared-access upstream channel used by the first plurality of nodes to communicate with the Head End. Propagation delay data associated with at least a portion of the plurality of nodes using the at least one upstream channel is obtained. The propagation delay data is then used to dynamically adjust the lookahead time value associated with the generating of MAP messages for the at least one upstream channel.

49 Claims, 11 Drawing Sheets

TECHNIQUE FOR DYNAMICALLY ADJUSTING LOOKAHEAD TIME FOR CHANNEL MAP MESSAGES TO ACHIEVE OPTIMAL PACKET PERFORMANCE OVER AN ACCESS NETWORK

BACKGROUND OF THE INVENTION

This invention relates to digital computer network technology. More specifically, it relates to methods and apparatus for improving packet performance on upstream and downstream channels of an access network.

Broadband access technologies such as cable, fiber optic, and wireless have made rapid progress in recent years. Recently there has been a convergence of voice and data networks which is due in part to US deregulation of the telecommunications industry. In order to stay competitive, companies offering broadband access technologies need to support voice, video, and other high-bandwidth applications over their local access networks. For networks that use a shared access medium to communicate between subscribers and the service provider (e.g., cable networks, wireless networks, etc.), providing reliable high-quality voice/video communication over such networks is not an easy task.

A cable modem network or "cable plant" employs cable modems, which are an improvement over conventional PC data modems and provide high speed connectivity. Cable modems are therefore instrumental in transforming the cable system into a full service provider of video, voice and data telecommunications services. Digital data on upstream and downstream channels of the cable network is carried over radio frequency ("RF") carrier signals. Cable modems convert digital data to a modulated RF signal for upstream transmission and convert downstream RF signal to digital form. The conversion is done at a subscriber's home. At a cable modem termination system ("CMTS") located at a Head End of the cable network, the conversions are reversed. The CMTS converts downstream digital data to a modulated RF signal, which is carried over the fiber and coaxial lines to the subscriber premises. The cable modem then demodulates the RF signal and feeds the digital data to a computer. On the return path, the digital data is fed to the cable modem (from an associated PC for example), which converts it to a modulated RF signal. Once the CMTS receives the upstream RF signal, it demodulates it and transmits the digital data to an external source.

FIG. 1 is a block diagram of a typical two-way hybrid fiber-coaxial (HFC) cable network system. It shows a Head End 102 (essentially a distribution hub) which can typically service about 40,000 homes. Head End 102 contains a CMTS 104 that is needed when transmitting and receiving data using cable modems. Primary functions of the CMTS include (1) receiving baseband data inputs from external sources 100 and converting the data for transmission over the cable plant (e.g., converting Ethernet or ATM baseband data to data suitable for transmission over the cable system); (2) providing appropriate Media Access Control (MAC) level packet headers for data received by the cable system, and (3) modulating and demodulating the data to and from the cable system.

Head End 102 connects through pairs of fiber optic lines 106 (one line for each direction) to a series of fiber nodes 108. Each Head End can support normally up to 80 fiber nodes. Pre-HFC cable systems used coaxial cables and conventional distribution nodes. Since a single coaxial cable was capable of transmitting data in both directions, one coaxial cable ran between the Head End and each distribution node. In addition, because cable modems were not used, the Head End of pre-HFC cable systems did not contain a CMTS. Returning to FIG. 1, each of the fiber nodes 108 is connected by a coaxial cable 110 to two-way amplifiers or duplex filters 112, which permit certain frequencies to go in one direction and other frequencies to go in the opposite direction (different frequency ranges are used for upstream and downstream paths). Each fiber node 108 can normally service up to 500 subscribers. Fiber node 108, coaxial cable 110, two-way amplifiers 112, plus distribution amplifiers 114 along with trunk line 116, and subscriber taps, i.e. branch lines 118, make up the coaxial distribution system of an HFC system. Subscriber tap 118 is connected to a cable modem 120. Cable modem 120 is, in turn, connected to a subscriber computer 122.

In order for data to be able to be transmitted effectively over a wide area network such as HFC or other broadband computer networks, a common standard for data transmission is typically adopted by network providers. A commonly used and well known standard for transmission of data or other information over HFC networks is DOCSIS. The DOCSIS standard has been publicly presented by Cable Television Laboratories, Inc. (Louisville, Colo.) in document control number SP-RFIv1.1-I03-991105, Nov. 5, 1999. That document is incorporated herein by reference for all purposes.

Data Communication in Cable Networks

According to the DOCSIS standard, data is transferred by a request-grant mechanism. In order for a cable modem to transmit data to the Head End, it must first send a data grant request to the CMTS. The CMTS, on receiving a request from a cable modem on a particular upstream channel, allocates one or more time slots on that upstream channel for the cable modem to send its data.

The CMTS includes a Media Access Control (MAC) scheduler which is responsible for scheduling types of slot allocations for one or more upstream channels. According to the DOCSIS standard, the scheduling for the shared use of a particular upstream channel is coordinated using channel MAP messages generated specifically for that upstream channel. The CMTS includes a MAP generating device which communicates with the MAC scheduler for generating MAP messages for one or more designated upstream channels. The channel MAP messages which are generated for a particular upstream channel are broadcast to each of the cable modems using that particular upstream channel to communicate with the CMTS. Each MAP message may include a plurality of different time slot types allocated for different purposes, such as, for example, data grant slots, initial ranging slots, maintenance slots, etc.

When the CMTS receives a data grant request from a cable modem on a particular upstream channel, the CMTS schedules a future data grant slot allocation in a MAP message to be broadcast (on a downstream channel) to the requesting cable modem. When the MAP message is received at the cable modem, the cable modem identifies the data grant slot which has been allocated to it, and broadcast its data on the upstream channel at the specific time corresponding to the allocated data grant slot.

As commonly known to one having skill in the relevant art, upstream packet performance in a cable network may be effected by a variety of different factors. One factor which effects the upstream packet performance relates to the delays associated with a cable network. Performance of data transmission and other aspects of the cable network are influenced by different types of delays which are inherent in the cable network. For example, when the CMTS receives a data grant request from a specific cable modem on a particular upstream channel, the time value of the data grant slot allocated to this cable modem must be far enough ahead in the future to account for the delays associated with, for example, MAP construction, propagation of the MAP message to the cable modem, processing of the MAP message by the cable modem, etc. Moreover, since many of the delay values inherent in the network vary depending upon specific network conditions, conventional cable networks are typically configured to operate using maximized delay values based upon anticipated worst-case conditions in the network. As a result, optimal performance of data transmission across the network is compromised. Further, as the use of cable networks or other access networks proliferate in the marketplace, conventional techniques for implementing data communication over a cable network may be not be sufficient for handling larger volumes of traffic which may be caused, for example, by a greater number of users accessing the Head End or by new and emerging broad band network applications such as, for example, telephony.

Accordingly, there exists a continual need to improve data communication performance over an access network in order to accommodate heavier traffic patterns which may be due to new and emerging network applications and technologies, as well as a greater demand for broadband access to shared to networks such as the internet.

SUMMARY OF THE INVENTION

According to specific embodiments of the present invention, a method and computer program product are described for improving packet performance in an access network. The access network comprises a Head End and a plurality of nodes. The Head End includes an access control system and a current time reference source. The access network further includes at least one downstream channel used by the Head End to communicate with a first plurality of network nodes, and at least one shared-access upstream channel used by the first plurality of nodes to communicate with the Head End. The access control system includes a MAP generating device for generating MAP messages of future slot allocations on the at least one upstream channel. Each MAP message specifies a specific, future allocation start time (SAT) for that particular MAP message. The SAT for each MAP message is determined by adding a lookahead time (LAT) value to a current time value at the Head End which is obtained while the MAP message is being generated by the MAP generating device. Propagation delay data associated with at least a portion of the plurality of nodes using the at least one upstream channel is obtained. The propagation delay data corresponding to a particular node is obtained from ranging procedures performed between the access control system and the node. The propagation delay data is then used to dynamically adjust the lookahead time value associated with the generating of MAP messages for the at least one upstream channel. According to a specific aspect of the invention, the lookahead time value is dynamically calculated using a minimum propagation delay value, which corresponds to a farthest on-line node on the at least one upstream channel.

According to a specific embodiment, a minimum lookahead time value is used for generating MAP messages which do not include initial ranging slot allocations, and a maximum lookahead time value is used for generating MAP messages which include at least one initial ranging slot allocation. The minimum lookahead time value is calculated using the minimum propagation delay value corresponding to the farthest on-line node on the at least one upstream channel. The maximum lookahead time value is calculated using a maximum propagation delay value, which is based upon a maximum allowable distance between a node on the at least one upstream channel and the Head End of the access network.

An alternate embodiment of the present invention is directed to a Head End of an access network which comprises a plurality of nodes. The access network includes at least one downstream channel used by the Head End to communicate with a first plurality of the network nodes, and at least one shared access upstream channel used by the first plurality of nodes to communicate with the Head End. The Head End includes a source providing a current time reference, and a MAP generating device configured or designed to generate MAP messages of future slot allocations on the at least one upstream channel. Each MAP message specifies a future allocation start time (SAT) specific to that particular MAP message. The Head End is configured or designed to determine the SAT for each MAP message by adding a lookahead time (LAT) value to a current time value at the Head End which is obtained while the MAP message is being generated. The Head End is also configured or designed to obtain propagation delay data associated with at least a portion of the plurality of nodes using the at least one upstream channel. The propagation delay data for a node may be obtained from ranging procedures performed between the Head End and the node. The Head End is further configured or designed to use the propagation delay data to dynamically adjust the lookahead time value associated with the generating of MAP messages for the at least one upstream channel.

In a specific embodiment, the Head End is further configured or designed to calculate a minimum lookahead time value using a minimum propagation delay value which is based upon a farthest on-line node on the at least one upstream channel. Further, according to another embodiment, the minimum lookahead time value is used for generating MAP messages which do not include initial ranging slot allocations, and a maximum lookahead time value is used for generating MAP messages which include at least one initial ranging slot allocation. The maximum lookahead time value is calculated using a maximum propagation delay value, which is based upon a maximum allowable distance between a node on the at least one upstream channel and the Head End of the access network.

According to a specific embodiment, the access network is a cable network, wherein the plurality of nodes are cable modems, and wherein the access control system is a Cable Modem Termination System (CMTS). In this embodiment, the propagation delay data corresponds to offset data obtained during ranging procedures between a cable modem and the CMTS.

Additional features and advantages of the various aspects of the present invention will become apparent from the description of its preferred embodiments, which description should be taken in conjunction with the accompanying drawings.

DETAILED DESCRIPTION OF THE PREFERRED EMBODIMENTS

Figure 1:
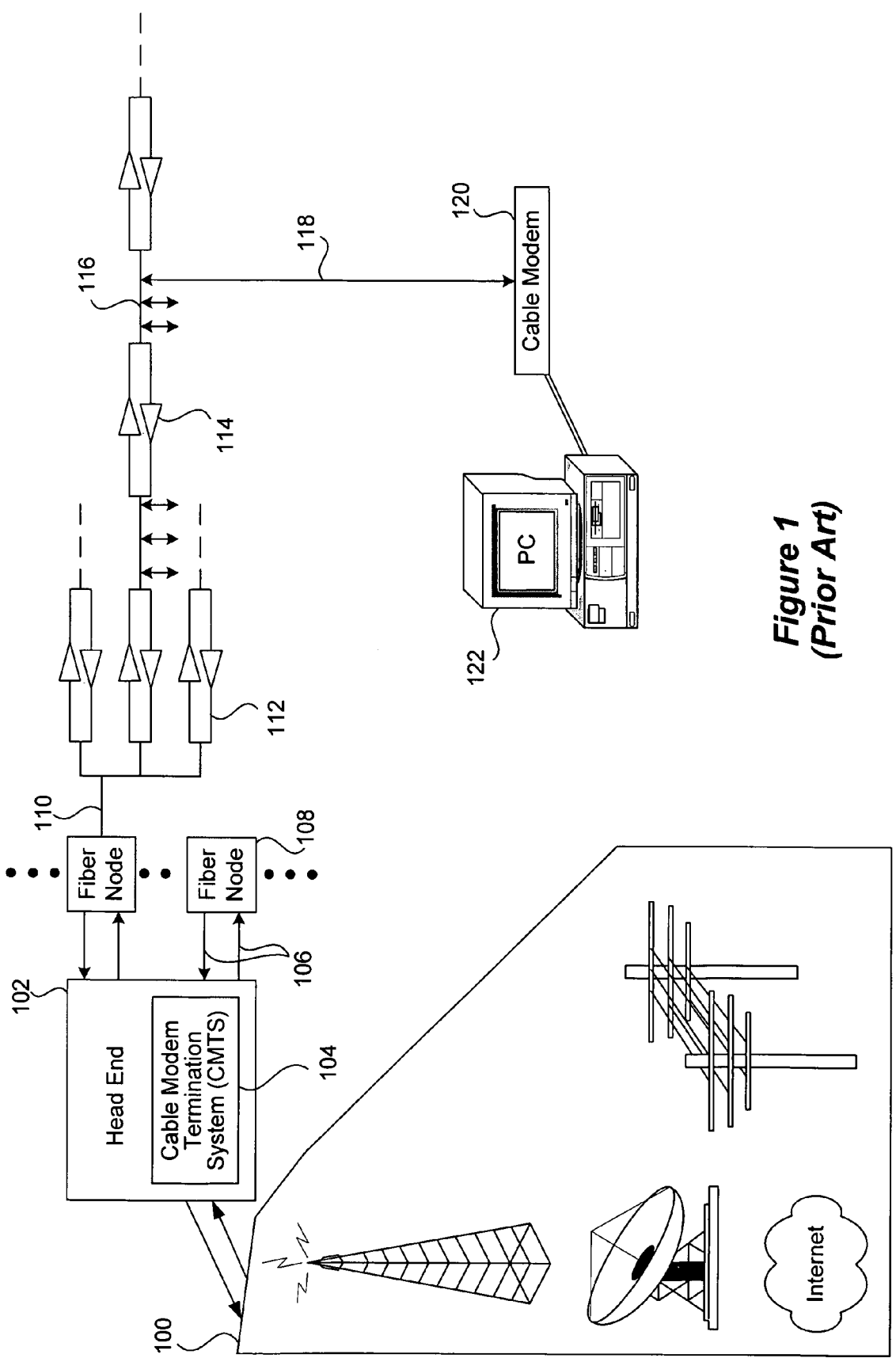
FIG. 1 shows a schematic block diagram of a cable network which may be used with the technique of the present invention.
Figure 2:
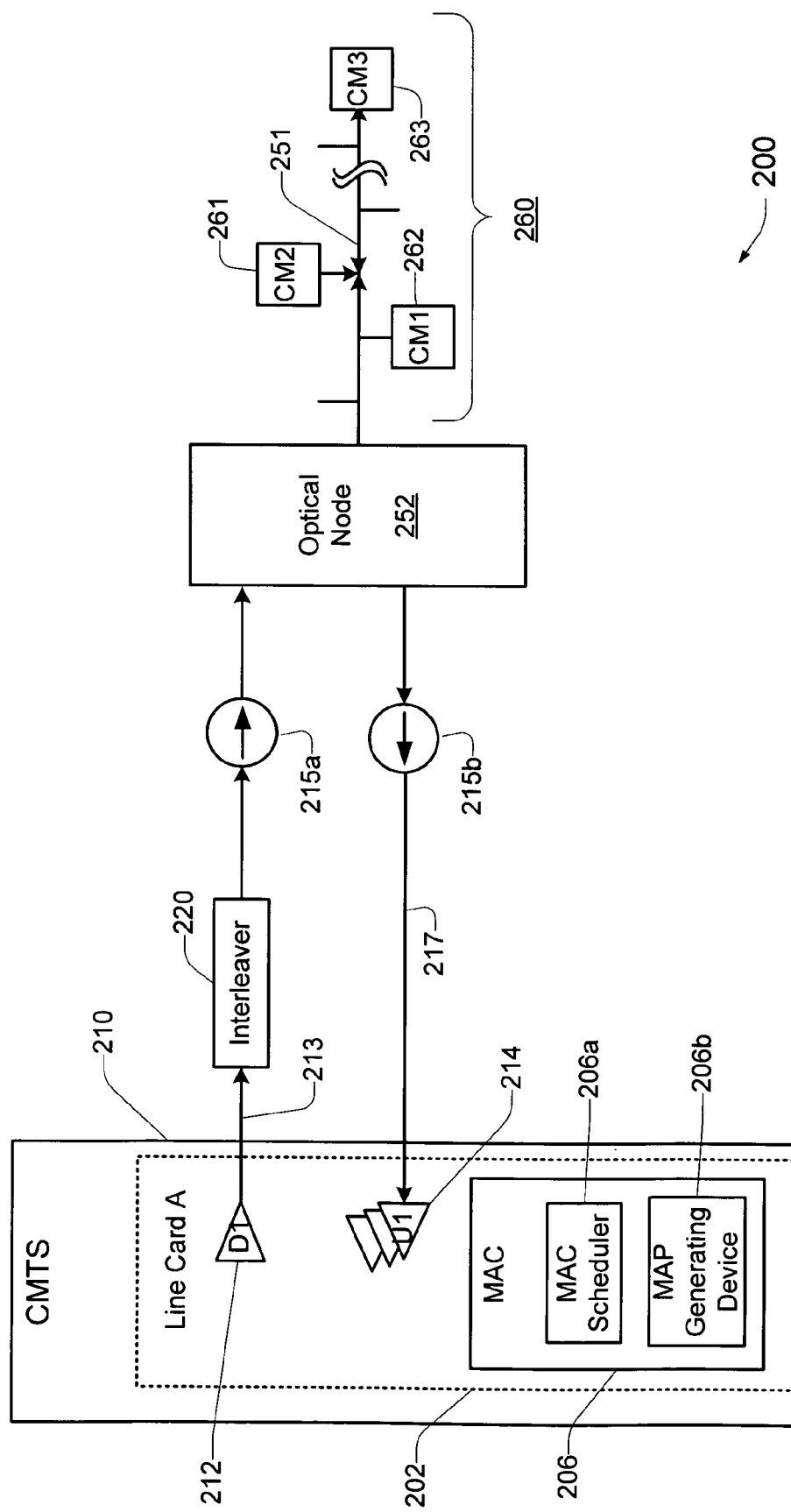
FIG. 2 shows an example of a portion of a cable network 200 which may be used for implementing the technique of the present invention.

FIG. 2 shows a portion of a cable network 200. The cable network of FIG. 2 includes a plurality of cable modems 260 which communicate with a Cable Modem Termination System (CMTS) 210, located at the Head End of the cable network. In the example of FIG. 2, the CMTS 210 includes at least one line card 202. The line card 202 includes a downstream channel transmitter 212, at least one upstream channel receiver 214, and a Media Access Controller (MAC) 206. MAC block 206 may be configured or designed to implement the functions of a MAC scheduler 206a and a MAP generating device 206b. A primary function of the MAC scheduler 206a is to coordinate the scheduling of slot allocations for each upstream channel associated with line card A 202. A primary function of the MAP generating device 206b is to generate channel MAP messages in accordance with the scheduling information provided by the MAC scheduler. In the Example of FIG. 2, it is assumed that the CMTS communicates with the plurality of cable modems 260 via downstream channel D1, and that the plurality of cable modems 260 communicate with the CMTS via upstream channel U1.

As described briefly in the background section of this application, scheduling for the use of upstream channel U1 by cable modems 260 is coordinated via channel MAP messages which are generated at the CMTS and broadcast to the plurality of cable modems 260 via downstream channel D1. Examples of MAP messages for upstream channel U1 are shown in FIG. 2A of the drawings.

Figure 2A:
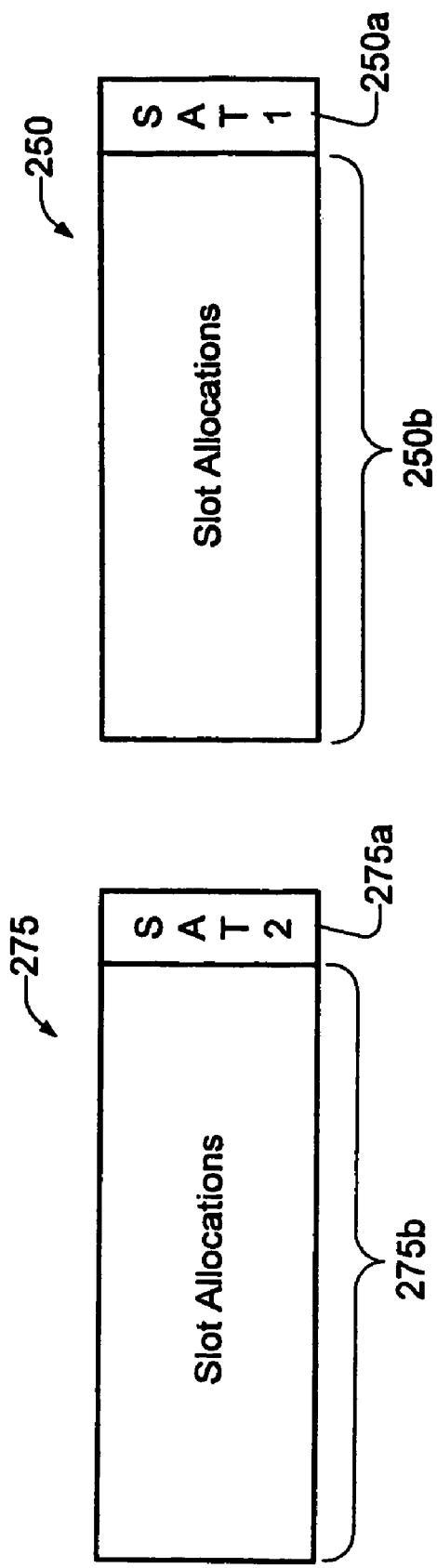
FIG. 2A shows a block diagram of upstream channel MAP messages which may be used in conjunction with the technique of the present invention.

FIG. 2A shows an example of two MAP messages 250 and 275, which may be used by cable modems 260 for coordinating access to upstream channel U1 (FIG. 2). As shown in FIG. 2A, each MAP message 250, 275 includes a specific start allocation time (SAT), and includes one or more time slot allocations for the upstream U1 channel, in accordance with the DOCSIS protocol. The SAT value of a particular MAP message specifies the beginning, future start time of slot allocations specified in that MAP message. For example, MAP message 250 may have a start allocation time SAT1=100, meaning that the first slot allocated in MAP message 250 begins at time T=100, where the time is based upon a time reference maintained at the CMTS.

Additional slot allocations in MAP message 250 are described in terms of offset values from the SAT1 time value. For example, MAP message 250 may include a data grant slot allocation for cable modem CM1, which is specified at starting at offset=10. This means that the CM1 cable modem should send its data to the CMTS on upstream channel U1 at time T=100+10=110. A single MAP message may include a plurality of individual time slots which have been allocated for specific purposes.

According to the DOCSIS protocol, all slot allocations on a particular upstream channel are continuous. Thus, for example, if MAP message 250 has a start allocation time SAT1=100 (which corresponds to minislot number 100 at the Head End), and includes a plurality of slot allocations assignments which, together total 40 minislots, the next MAP message 275 will have a start allocation time SAT2=100+40=140 (corresponding to minislot number 140, as determined by the timestamp reference device at the Head End).

Returning to FIG. 2, it will be appreciated that the performance of the cable network is influenced by a variety of factors. One of these factors relates to the different types of delays which are inherent in a cable network. For example, a typical sequence of events for transferring data over a cable network is as follows:

(1) Cable modem transmits a data grant request to the CMTS on upstream channel U1.

(2) Upon receiving the data request, the CMTS generates a MAP message which includes a data grant allocation slot specifying a precise, future time for the cable modem to transmit its data.

(3) The MAP message is broadcast by the CMTS to the cable modem via downstream channel D1.

(4) The cable modem receives and processes the MAP message in order to determine the precise time in which it is to transmit its data on upstream channel U1.

(5) The cable modem transmits its data to the CMTS at the time specified by the data grant slot allocation in the MAP message.

It will be appreciated that there are a number of inherent delays associated with the sequence of events described above which may negatively impact packet performance on the upstream and downstream channels. For example, a first delay relates to a MAP construction delay, which is the delay associated with the MAP generating device constructing or generating a MAP message. Typically, the MAP construction delay is a variable delay which ranges from about 50 microseconds to about 100 microseconds.

A second type of delay is the downstream interleaver delay which is associated with interleaving data or other information on each downstream channel in the network. As shown in FIG. 2, for example, data which is transmitted from the CMTS over downstream channel D1 to the plurality of cable modems 260 passes through interleaver block 220, thereby incurring some delay while being processed by this block. Typically, the interleaver delay, once established, will be a fixed delay which ranges from about 100 microseconds to about 4 milliseconds.

A third type of delay effecting the performance of the network is the propagation delay, which corresponds to the round-trip delay incurred for a signal to travel from the CMTS to the desired cable modem and return. As shown in FIG. 2, each cable modem (e.g., CM1, CM2, CM3, etc.) may be located at a respectively different physical distance from the CMTS 210. For this reason, the propagation delay value associated with a particular upstream channel is highly variable. For example, depending upon the actual distance between a cable modem and the CMTS, the propagation delay value may range from about 100 microseconds to about 2 milliseconds.

A conventional technique for determining the propagation delay value for a selected upstream channel is to calculate a maximum propagation delay value based upon the worst-case scenario of a cable modem being physically connected to the upstream channel at a farthest possible distance from the CMTS. Typically, in conventional cable networks, the farthest possible distance between a cable modem and the CMTS is about 100 miles. Using this worst case scenario, conventional cable networks typically estimate the maximum roundtrip propagation delay for an upstream channel to be about 1.6 milliseconds (0.8 milliseconds one-way).

A fourth delay effecting the performance of the cable network is the MAP processing delay, which is the delay associated with a cable modem processing the MAP message. Typically, the MAP processing delay is a fixed value which varies depending upon a particular cable modem vendor or manufacturer. According to the DOCSIS specification, the maximum permitted MAP processing delay at a cable modem is 200 microseconds. DOCSIS will not certify a cable modem which requires more than 200 microseconds to process and respond to a MAP message.

In order to compensate and account for the various propagation delays inherent in a conventional cable network, the CMTS is required to generate and transmit MAP messages to the cable modems well in advance of the start allocation time specified in each MAP message. In other words, the start allocation time of a particular MAP message must be far enough in advance to account for all the anticipated delays (e.g. MAP construction delay, interleaver delay, propagation delay, MAP processing delay, etc.), and still allow the cable modem to receive and process the MAP message in time to respond appropriately. This difference between the start allocation time of the MAP message and the current time value at the Head End (determined at the time when the SAT timestamp is placed into the MAP message) is referred to as the lookahead time (LAT) value.

Traditionally, the lookahead time value assigned to a particular upstream channel [i] is a predetermined constant value which may be calculated according to the formula:

$$LAT[i]=d_{MC}+d_I+2*d_{PROP}[i]+d_{PROC}, \quad (1)$$

where $d_{MC}$ represents the MAP construction delay, $d_I$ represents the interleaver delay, $d_{PROP}$ represents the propagation delay (1-way) for the upstream channel [i], and $d_{PROC}$ represents the cable modem processing delay.

In conventional systems, where a worst case value for the propagation delay is assumed, and the interleaver delay has been predetermined in accordance with a specific interleaver configuration, the lookahead time value for a particular upstream channel will be a pre-defined static value. For example, typically the LAT value for each upstream channel of a conventional cable network ranges from 6–8 milliseconds (assuming worst case scenario for propagation delay, and 1 millisecond for interleaver delay).

It will be appreciated that, for purposes of clarity, the measurement units used to describe many of variables in this application (e.g. LAT value, SAT value, offset value, MAX_TX_OFFSET, $d_{MC}$, $d_I$, $d_{PROP}$, $d_{PROC}$, etc.) have been expressed in terms of milliseconds or microseconds. However, it is to be understood that, where appropriate, measurement units other than microseconds or milliseconds may be used to describe and/or calculate the time related values corresponding to one or more of the variables described in this application. For example, although the LAT value may be expressed in terms of milliseconds, in at least one embodiment of the invention, it is useful to express the LAT value in term of minislots, where 1 minislot is equal to about n microseconds. In a specific embodiment where 1 minislot is equal to about 50 microseconds (depending upon fragmentation), the LAT value for an upstream channel of a conventional cable network may range from about 120 minislots to about 160 minislots.

The lookahead time value associated with a particular upstream channel is used to determine that start allocation time (SAT) for each MAP message generated for that upstream channel. For any given MAP message associated with a particular upstream channel, the SAT value of the MAP message should be at least be equal to the sum of the current time value (at the CMTS) and the LAT value for that upstream channel. For example, assuming a lookahead time value of LAT=160 minislots, if the current time value at the CMTS is T=1000 (corresponding to minislot number 1000 at the Head End), the start allocation time (SAT) value for the next MAP message to be transmitted by the CMTS to cable modems on the specified upstream channel should be at least equal to SAT=1000+160=1160. This MAP message will therefore provide upstream channel slot allocation assignment information to cable modems on the specified upstream channel, commencing with minislot (or slot) number 1160 (based upon the time reference device at the Head End).

It will be appreciated that the particular value assigned as the lookahead time value for a particular upstream channel affects the packet performance of that upstream channel since the LAT value limits the rate at which packets can be sent on the upstream channel. More specifically, as described previously, the DOCSIS protocol for transferring data over a cable network includes a cable modem making a data grant request, the CMTS generating a MAP message which includes a data grant allocation for that cable modem, and the cable modem receiving the MAP message and transmitting its data at the designated time slot. However, when the data grant request from a cable modem is received at the CMTS, the CMTS can not immediately respond by sending a MAP message which includes a data grant allocation for the cable modem, even if the CMTS were able to immediately receive the data from the cable modem. Rather, according to the DOCSIS protocol, the CMTS must schedule a data grant allocation for the requesting cable modem in a future MAP message having a future start allocation time that is, for example, 8 milliseconds in the future from the current time value at the Head End (based on an LAT value of 8 mSec). Thus, the earliest possible time in which the cable modem could transmit its data after making a data grant request is 8 milliseconds after the grant request has been received at the CMTS. This 8 milliseconds corresponds to the lookahead time value which is used for generating MAP messages for the upstream channel. Thus, it can be seen that by decreasing the lookahead time value, packet performance of the cable network may be increased.

Accordingly, one aspect of the present invention relates to minimizing or optimizing the lookahead time (LAT) value for each upstream channel in the network to thereby improve the overall packet performance of the cable network.

As illustrated in equation (1) above, the lookahead time value represents an aggregate of various types of delays that are inherent in the cable network. Experimental evidence conducted by the present inventive entity has shown that, in at least some cable network configurations, the propagation delay represents a significant fraction of the overall lookahead time delay value. Therefore, one technique for reducing the overall lookahead time value for a selected upstream channels is to reduce the propagation delay value associated with the selected upstream channel.

As described previously, a conventional technique for determining the propagation delay value of a particular upstream channel is to base this value upon the worst case scenario of a cable modem being connected to the upstream channel at a point which is a farthest allowable distance to the CMTS that is supported by the network (e.g. 100 miles). This theoretical worst case propagation delay value may be referred to as a maximum allowed propagation delay value.

According to the technique of the present invention, however, a minimum propagation delay value may be used for calculating an optimized LAT value for a selected upstream channel, wherein the minimum propagation delay value corresponds to the propagation delay value associated with a farthest on-line modem on the upstream channel. In other words, the minimum propagation delay value corresponds to a maximum runtime propagation value associated with a farthest on-line modem on the selected upstream channel. This maximum runtime propagation delay value is used to calculate an optimized LAT value for the selected upstream channel. This optimized lookahead time value may then be used for generating MAP messages associated with the selected upstream channel. By optimizing the LAT value(s) for each upstream channel in the network, packet performance of the network may be significantly improved.

In specific embodiments, the minimum propagation delay value for a selected upstream channel may be derived using information obtained during ranging procedures performed between the CMTS and cable modes on the selected upstream channel. In one embodiment, the propagation delay data is obtained during initial ranging procedures conducted between the CMTS and the cable modems. Additionally, propagation delay data may be obtained during periodic ranging procedures performed between the CMTS and the cable modems. A standard technique for performing initial ranging and periodic ranging procedures between a cable modem and the CMTS is specified in the DOCSIS protocol and is briefly described below.

Initial ranging is primarily used by a cable modem when first attempting to gain access to the CMTS. During the initial ranging procedure, the cable modem transmits a test signal to the CMTS. When the CMTS received this test signal, it determines a propagation value (commonly referred to as an offset value) which is directly related to the physical distance between the CMTS and the cable modem. The offset value is then transmitted by the CMTS back to the cable modem so that the cable modem may adjust the timing of its upstream transmissions in order to compensate for the propagation delay related to the physical distance between the cable modem and the CMTS. The CMTS may also store the offset value and service identifier (SID) associated with that particular cable modem in a database (or other data structure) at the Head End. Traditionally, however, the stored offset information at the Head End is not used for any other purpose.

In a manner similar to the initial ranging procedure, periodic ranging procedures are frequently performed between the CMTS and on-line cable modems. During initial ranging, the base offset value for a specific cable modem is determined. This offset value may then be adjusted or fine tuned during periodic ranging procedures performed between the specific cable modem and the CMTS. During periodic ranging, the CMTS determines, among other things, whether the offset value for a specific cable modem has drifted from the base offset value obtained during initial ranging. Since the physical distance between the cable modem and the CMTS is not likely to change, it is unlikely that the offset value associated with that cable modem will have drifted from its base value. However, any drift which is measured during periodic ranging may be used to update the base offset value for the specific cable modem performing the periodic ranging procedure.

In accordance with a specific embodiment of the present invention, the propagation delay data which is obtained during the initial and/or periodic ranging procedures may be analyzed to determine the maximum runtime propagation delay value corresponding to a farthest on-line cable modem on the selected upstream channel. This maximum runtime propagation delay value is referred to as the "minimum" propagation delay value, which may be thought of as the minimum allowable propagation delay value for a selected upstream channel. In at least one embodiment, the minimum propagation delay value corresponds to the propagation delay value associated with the farthest on-line cable modem on the selected upstream channel. Preferably, the minimum propagation delay value will be less than or equal to the theoretical maximum allowed propagation delay value for the selected upstream channel. Moreover, in accordance with at least one embodiment of the present invention, the cable modem offset information obtained during initial and/or periodic ranging procedures is advantageously used to optimize the lookahead time values associated with selected upstream channels in the network.

Figure 4A:
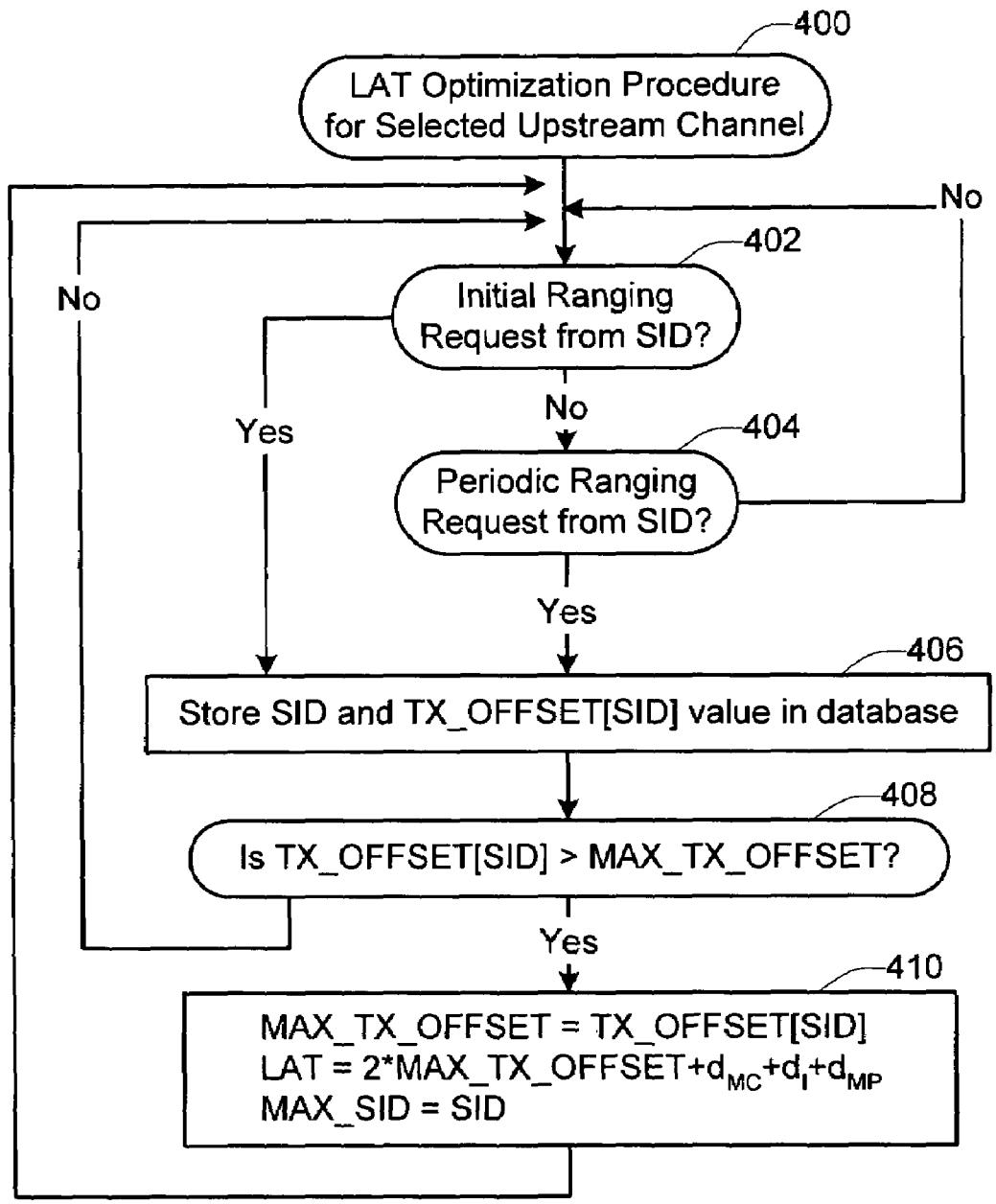
FIG. 4A shows a flow diagram of a lookahead time optimization procedure 400 in accordance with a specific embodiment of the present invention.

FIG. 4A shows a flow diagram of a Lookahead Timing Optimization procedure 400 in accordance with a specific embodiment of the present invention. In a specific embodiment, the lookahead timing procedure may be used to optimize the lookahead time value for each upstream channel in the cable network, regardless of the DOCSIS domain to which each channel belongs.

Generally, the LAT Optimization procedure 400 uses propagation delay (or offset) data obtained during ranging procedures to determine the propagation delay of a farthest on-line modem of a selected upstream channel. The propagation delay value associated with this farthest on-line modem is used as the minimum propagation delay value when computing the lookahead timing value for that upstream channel.

In a specific embodiment, the LAT Optimization procedure 400 may be implemented in hardware and/or software at the Head End of the cable network. Further, the CMTS may include additional software and/or hardware for implementing the LAT Optimization procedure 400 of FIG. 4A. Procedure 400 describes a technique for optimizing the LAT value for a selected upstream channel in the cable network. However, it will be appreciated that this procedure may be used to optimize a plurality of selected upstream channels in the network.

At 402 and 404, the CMTS awaits an initial or periodic or ranging request from a cable modem on a selected upstream channel. According to the DOCSIS protocol, each cable modem is associated with a service ID referred to as a "SID". Once an initial or periodic ranging procedure has been initiated between a cable modem and the CMTS, the CMTS stores (406) the SID and corresponding offset value (TX_OFFSET[SID]) in a database at the Head End of the network. At 408, the CMTS determines whether the propagation delay value (TX_OFFSET[SID]) of the cable modem performing the current ranging procedure is greater than the minimum propagation delay value (MAX_TX_OFFSET) which currently exists for the selected upstream channel.

Figure 3:
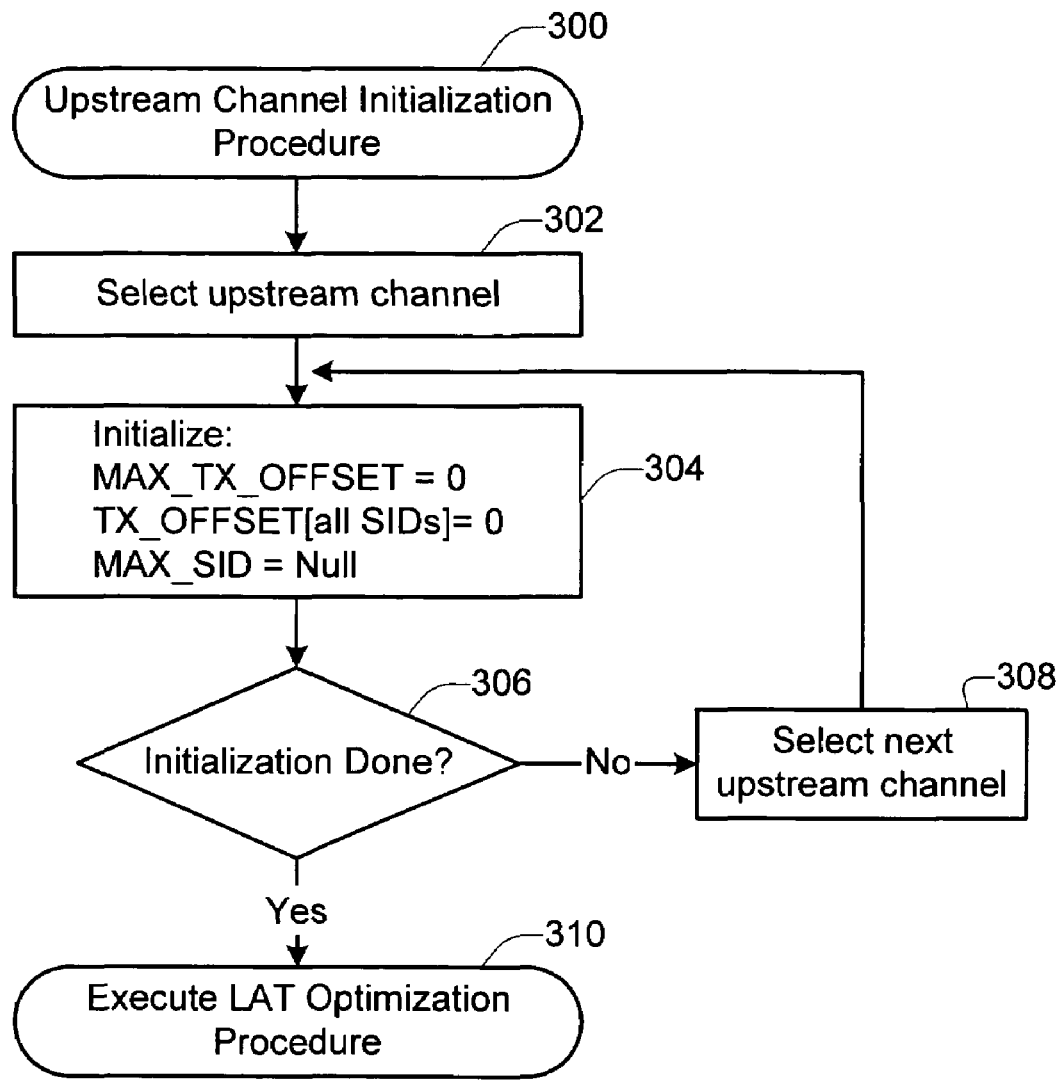
FIG. 3 shows a flow diagram of a CMTS initialization procedure 300 in accordance with a specific embodiment of the present invention.

In a specific embodiment, as shown in FIG. 3 for example, the MAX_TX_OFFSET value for each upstream channel is initialized to zero. Thereafter, as cable modems on a selected upstream channel register with the CMTS (e.g. during initial ranging procedures), the MAX_TX_OFFSET value will steadily increase as more distant cable modems sign onto the network.

Returning the FIG. 4A, if it is determined that the TX_OFFSET[SID] offset value (of the cable modem performing a ranging procedure with CMTS) is greater than the MAX_TX_OFFSET value, then it may be concluded that the cable modem performing the current ranging procedure is the farthest on-line cable modem on the selected upstream channel (at least for the time being). Accordingly, as shown at 410, the propagation delay value associated with this farthest on-line cable modem is assigned as the minimum propagation delay value for the upstream channel (i.e. MAX_TX_OFFSET= TX_OFFSET[SID]). Additionally, the SID associated with this new farthest on-line cable modem is identified as being the farthest on-line cable modem for that upstream channel (i.e. MAX_SID=SID). Further, because a new minimum propagation delay value has been established, the lookahead time value for the selected upstream channel is recomputed using the new minimum propagation delay value (i.e. LAT= $2*MAX\_TX\_OFFSET+d_{MC}+d_I+d_{PROC}$). It is noted that the minimum propagation delay value identified as MAX_TX_OFFSET is expressed in terms of a one way trip between the CMTS and the cable modem. Thus, in order to express the round trip propagation delay, the MAX_TX_OFFSET value is doubled.

In specific embodiments the LAT Optimization procedure 400 may be implemented to run continuously, or may be implemented to run at specific intervals. Hence, as shown in FIG. 4A, after the minimum propagation delay and optimized LAT values have been updated at 410, the procedure returns to the beginning whereupon the LAT Optimization procedure 400 waits for other modems on the upstream channel to initiate an initial or periodic ranging request. Further, according to a specific embodiment, a separate run-time instance of the LAT Optimization procedure 400 may be initiated for each selected upstream channel in the network. Each instance of the LAT Optimization procedure may be configured to run in a serial or a parallel fashion with regard to each upstream channel in the network.

FIG. 3 shows a flow diagram of an Upstream Channel Initialization procedure 300 in accordance with a specific embodiment of the present invention. Generally, the Upstream Channel Initialization procedure initializes each of the variables and/or other parameters which may be used for implementing the lookahead timing optimization technique of the present invention. At 302, a particular upstream channel in the network is selected. At 304, the MAX_TX_OFFSET value (representing the minimum propagation delay value for the furthest on-line modem) of the selected upstream channel is initialized to zero. Additionally, the MAX_SID parameter (representing the SID of the farthest on-line modem) for the selected upstream channel is initialized to NULL. Further, the respective offset value (i.e. propagation delay value) for each cable modem on the selected upstream channel is initialized to zero. Once the various parameters for a particular upstream channel have been initialized, at 306, a determination is made as to whether all desired upstream channels have been initialized. If additional upstream channels remain which have not yet been initialized, at 308 the next upstream channel is selected, and the various parameters of the selected upstream channel are initialized (as described in block 304). After all desired upstream channels have been initialized, the LAT Optimization procedure 400 (FIG. 4A) is initiated (310).

Once the LAT Optimization procedure has been initiated for a selected upstream channel, the minimum propagation delay value and optimized lookahead time value for that upstream channel will continue to be updated as new modems sign on to the network via the selected upstream channel and/or perform periodic ranging procedures with the CMTS. An example of the LAT optimization technique of this invention will now be described with respect to FIG. 2 of the drawings.

In this example, it is assumed that the upstream channel U1 has already been initialized in accordance with Upstream Channel Initialization procedure 300 of FIG. 3. Next, we assume that cable modem CM1 (262) is the first cable modem on upstream channel U1 to transmit an initial ranging request to the CMTS. In accordance with the initial ranging procedure as specified by the DOCSIS protocol, the CMTS will obtain an offset value for the CM1 cable modem. This offset value represents a propagation delay associated with data transmitted from the CM1 modem to the CMTS, and it is directly related to the physical distance between the CM1 cable modem and the CMTS. Since CM1 is the first cable modem to perform an initial ranging procedure following the initialization of the upstream channel, CM1 will be determined to be the farthest on-line modem on the upstream channel, and its associated offset value (TX_OFFSET[$SID_{CM1}$]) will be assigned as the minimum propagation delay value (TX_MAX_OFFSET) for that upstream channel. Using the newly assigned minimum propagation delay value, the lookahead time value for the upstream channel is then computed in accordance with the formula shown in block 410 of FIG. 4A. Additionally, the MAX_SID identifier representing the farthest on-line cable modem on the upstream channel will be set equal to the SID of the CM1 cable modem.

Next, it is assumed that the next cable modem to initiate an initial ranging procedure with the CMTS is cable modem CM3 (263). As shown in FIG. 2, CM3 is connected to cable line 251 at a point which is physically farther from CMTS 210 than cable modem CM1. Accordingly, the propagation delay value associated with the CM3 modem will be greater than that of the CM1 modem. In accordance with the LAT Optimization procedure 400, the minimum propagation delay value (MAX_TX_OFFSET) will be set equal to the propagation delay value associated with cable modem CM3. The lookahead time value for the upstream channel U1 is then re-calculated using the new minimum propagation delay value corresponding to cable modem CM3. Additionally, cable modem CM3 is identified as being the farthest on-line modem on the U1 upstream channel.

The next modem to initiate an initial ranging request is cable modem CM2. As shown in FIG. 2, cable modem CM2 is physically connected to cable line 251 at a point which is more distant to the CMTS than CM1, but less distant to the CMTS than CM3. Accordingly, the propagation delay value associated with cable modem CM2 will be less than the propagation delay value associated with CM3, and therefore will be less than the minimum propagation delay value currently established for the upstream U1 channel. In accordance with the LAT Optimization procedure 400, the minimum propagation delay value, optimized LAT value, and farthest on-line modem identified on the upstream U1 channel will remain unchanged. That is to say, the minimum propagation delay value and optimized LAT value will still be based on the farthest on-line modem which has been identified as cable modem CM3.

Re-Calculation of LAT Value

At times it may be desirable to re-calculate the minimum propagation delay value and/or the optimized LAT value for one or more upstream channels. In a specific embodiment, the minimum propagation delay and optimized LAT values are re-calculated upon the occurrence of specific events or conditions such as, for example, detecting that the farthest on-line cable modem for a particular upstream channel has switched to a different upstream channel; detecting that the SID corresponding to the farthest on-line cable modem on a particular upstream channel has been deleted or destroyed at the CMTS (e.g. for non-payment of services rendered); detecting that a port corresponding to a particular upstream channel has been shut down or is unavailable; etc.

Figure 4B:
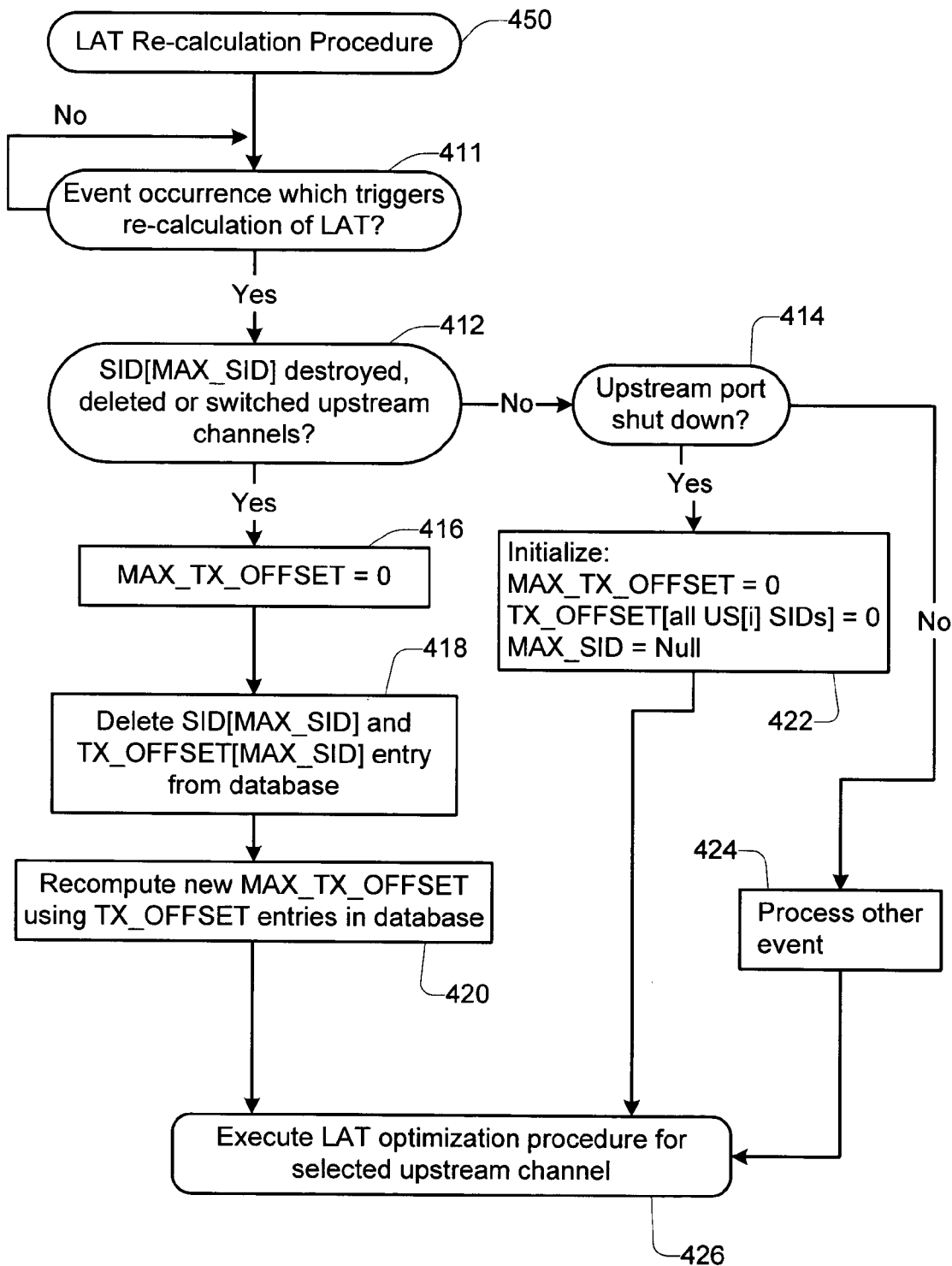
FIG. 4B shows a flow diagram of a lookahead time re-calculation procedure 450 in accordance with a specific embodiment of the present invention.

FIG. 4B shows a flow diagram of an LAT Re-calculation procedure 450 in accordance with a specific embodiment of the present invention. The LAT Re-calculation procedure 450 may be implemented via hardware and/or software at the Head End of the cable network. In the specific embodiment of FIG. 4B, the LAT Re-calculation procedure 450 is implemented at the CMTS. At 411, the CMTS checks for the occurrence of an event or condition which triggers the re-calculation of the lookahead time value for one or more selected upstream channels. If it is determined that the SID corresponding to the farthest on-line modem (SID [MAX_SID]) for a particular upstream channel has been destroyed, deleted, or switched to a different upstream channel (412), then, at 416, the minimum propagation delay (MAX_TX_OFFSET) value of the upstream channel on which the condition occurred is reset to zero. At 418, the SID corresponding to the farthest on-line modem of the upstream channel (which has been destroyed, deleted, or switched to a different upstream channel) and its corresponding propagation delay value entry are deleted from the "offset" database at the Head End.

Figure 4C:
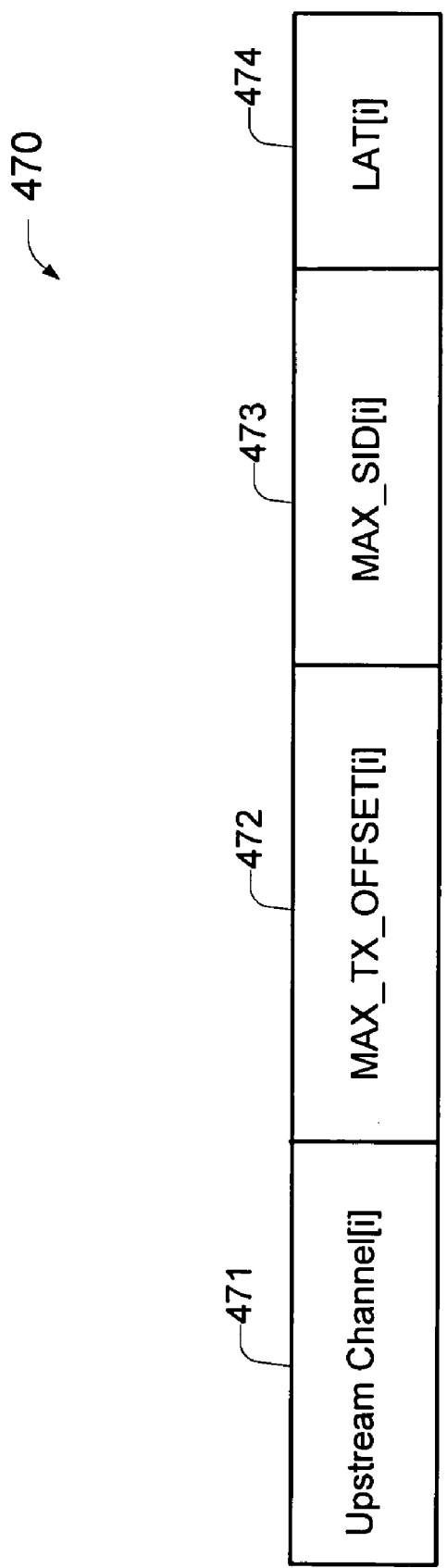
FIG. 4C shows an example of an entry in a database at the Head End which is used for storing information related to the LAT optimization technique of the present invention.

An example of an entry in the "offset" database at the Head End which is used for storing information related to the LAT optimization technique of the present invention is shown in FIG. 4C of the drawings. As shown in FIG. 4C entry 470 includes a field 471 identifying a particular upstream channel [i] in the network, a field 472 specifying the minimum propagation delay value for the farthest on-line modem of upstream channel [i], a field 473 specifying the SID of the farthest on-line modem on the upstream channel [i], and a field 474 specifying the optimized lookahead time value associated with upstream channel [i]. In a specific embodiment, the offset database includes a separate entry 470 for each upstream channel connected to the Head End.

Once the entry corresponding to the farthest on-line modem which has been destroyed, deleted or switched to a new upstream channel has been deleted from the offset database, the CMTS re-computes (420) a new minimum propagation delay value for a new farthest on-line modem on the selected upstream channel using the remaining propagation delay entries associated with the selected upstream channel which have been stored in the offset database. Thereafter, at 426, the LAT Optimization procedure is initiated or re-initiated for the selected upstream channel, whereupon a new, optimized LAT value will be calculated for the upstream channel.

Another event which may trigger the re-calculation of the LAT value for a particular upstream channel relates to the condition where the upstream port corresponding to the upstream channel has been shut down (such as, for example, when the upstream receiver has failed or when the line card corresponding to the upstream port for the upstream channel has been removed from the CMTS). If the CMTS detects that the upstream port for a particular upstream channel has been shut down (414), then, at 422, the minimum propagation delay value for that upstream channel is initialized to zero, the offset values corresponding to the cable modem on that upstream channel (US[i]) are each initialized to zero, and the SID identifier corresponding to the farthest on-line modem on the upstream channel is initialized to NULL. Thereafter, the LAT Optimization procedure may be initiated or re-initiated (426) in order to calculate a new LAT value for the upstream channel. In a specific embodiment, the CMTS may be configured or designed to wait for the upstream channel (which has gone off-line) to come back on-line before initiating or re-initiating the LAT Optimization procedure for the that upstream channel.

The LAT Re-calculation procedure 400 may also be evoked upon the occurrence of other conditions in the network. Such trigger conditions may vary depending upon implementation preferences of the service provider or cable network operator. As shown in FIG. 4B, an occurrence of one of these other conditions may be processed (424) in accordance with predefined instructions, and the LAT Optimization procedure initiated or re-initiated (426) for the selected upstream channel(s) on which the event or condition has occurred. Once the LAT value for a specific upstream channel has been optimized, the rate of data communication between the CMTS and the cable modems which use this upstream channel may be significantly improved. Moreover, since performance is an important factor in a shared media environment, the technique of the present invention for using the ranging offset information to optimize channel MAP lookahead time values helps to assure that maximum bandwidth and performance can be achieved and tuned to a plant topology.

Dynamic Adjustment of LAT Value

Once the LAT value for a particular upstream channel has been optimized in accordance with the technique of the present invention, a problem may arise if a more distant cable modem attempts to access the CMTS via that upstream channel. Since the LAT value associated with MAP messages generated for the upstream channel has been fine tuned only for the existing on-line cable modems on that upstream channel, the optimized LAT value may not be tuned to accommodate a new modem which attempts to join the upstream channel from a physical distances to the CMTS which is greater than that of any on-line modem on the upstream channel. Because the new modem is physically located at a greater distance from the CMTS than the existing on-line modems on the upstream channel, the propagation delay associated with this new cable modem will be greater than the current minimum propagation delay value established for the upstream channel. Thus, a situation could arise where the LAT value for the upstream channel is less than the overall delay associated with generating, transmitting, and processing a MAP message at the new cable modem. Accordingly, in this situation, the new cable modem may receive MAP messages which have expired start allocation times. Since conventional cable modems are configured to discard MAP messages which have an expired start allocation time, the new cable modem will be unable to access the CMTS via the upstream channel since, in order to gain access to the CMTS, the new cable modem must receive a valid MAP message (having a non-expired start allocation time) which includes an initial ranging slot allocation. Thus, if the new cable modem is unable to perform an initial ranging procedure with the CMTS, it will be unable to access the Head End using this upstream channel.

There are, however, a number of ways to overcome this problem. For example, one way to overcome this problem is to configure the CMTS to periodically switch between a "relaxed" lookahead time (based on the worst case propagation delay scenario) and an "optimized" lookahead time (based on the LAT optimization technique described in this application). Thus, in a specific embodiment, the CMTS may first generate channel MAPs for a selected upstream channel using an optimized LAT value of, for example, 2 milliseconds. At periodic intervals, in order to accommodate more distant cable modems attempting to access the CMTS via this upstream channel, the CMTS may switch over to a "relaxed" LAT value for generating MAP messages such as, for example, 8 milliseconds. Preferably, the "relaxed" lookahead value should be sufficiently large so as to ensure that a valid MAP message is received at a farthest possible cable modem on the upstream channel (based upon the worst case scenario). Additionally, it is preferable that at least one initial ranging slot be allocated in at least one of the MAP messages generated during the "relaxed" LAT cycle. When a new, farthest cable modem receives the MAP message specifying the initial ranging slot allocation, the cable modem is then able to perform initial ranging procedures with the CMTS. While initial ranging is being performed, the CMTS is able to use the LAT optimization technique of the present invention to re-calculate the optimized or minimum LAT value for that upstream channel based upon a new minimum propagation delay associated with the new, farthest cable modem. Thereafter, when the CMTS switches to the "optimized" LAT mode, the optimized LAT value will have been updated to accommodate the new cable modem.

Figure 5:
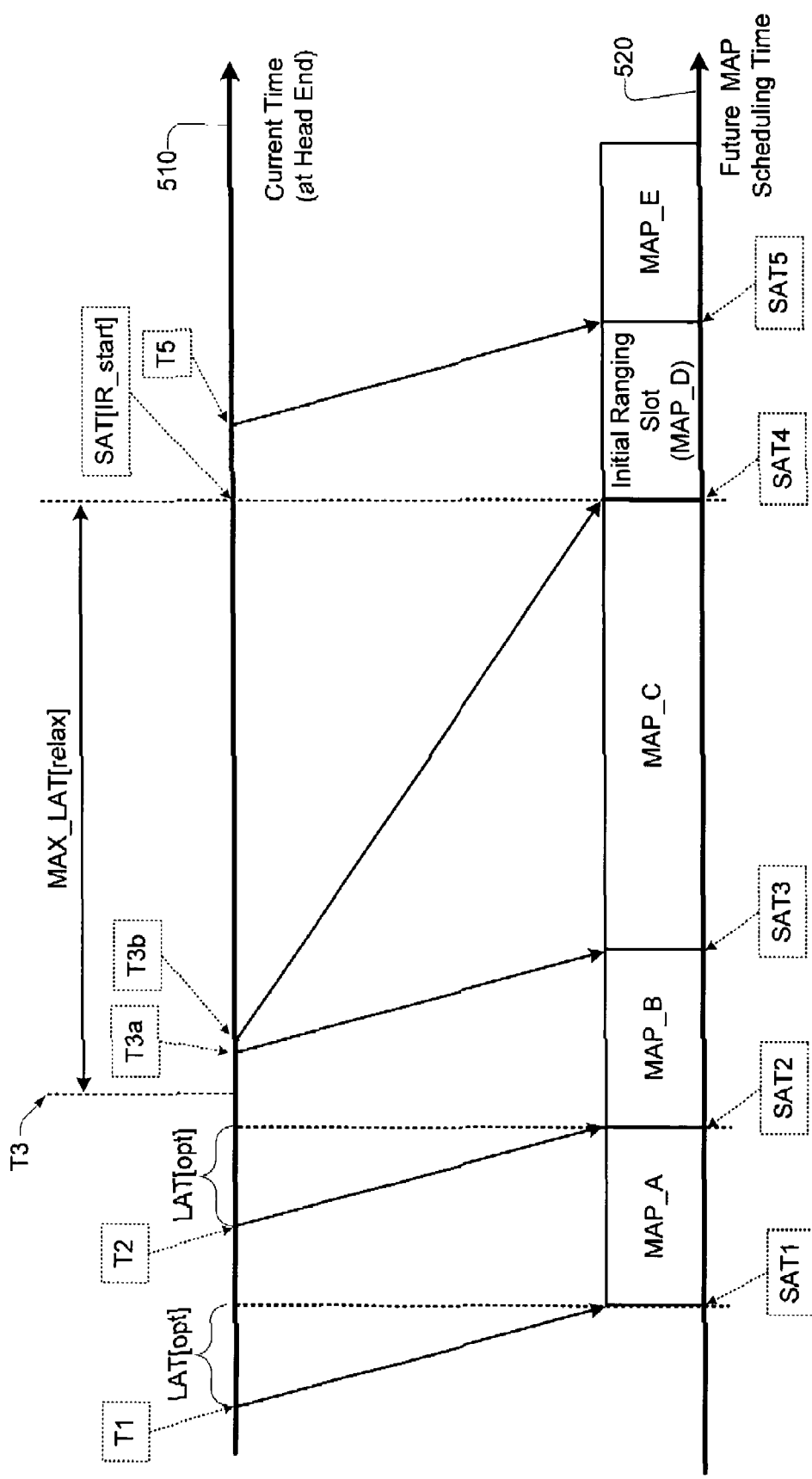
FIG. 5 shows a timing diagram illustrating how various channel MAPs are generated in accordance with a specific embodiment of the present invention.
Figure 6:
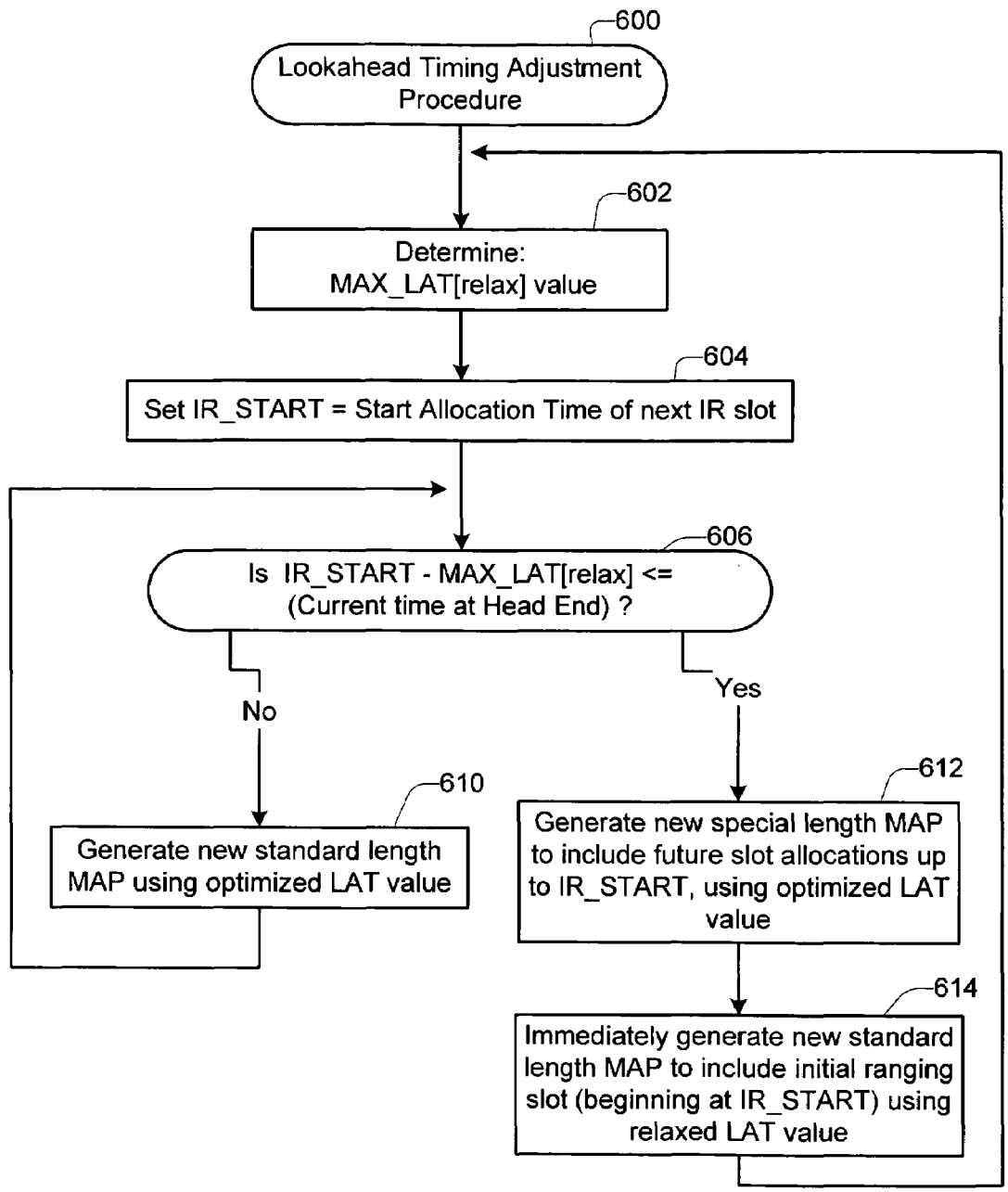
FIG. 6 shows a flow diagram of a lookahead timing adjustment procedure 600 in accordance with a specific embodiment of the present invention.

An alternate technique for overcoming the above-described problem is illustrated in FIGS. 5 and 6 of the drawings. This alternate technique takes advantage of the fact that the MAC scheduler at the Head End is responsible for incorporating initial ranging slot allocations into selected channel MAP message at specific time intervals. According to the DOCSIS protocol, one function of the MAC scheduler is to coordinate the scheduling of the various slot allocation types on one or more upstream channels. The MAC scheduler then communicates the scheduled slot allocations to the MAP generating device, which performs the actual function of generating MAP messages for the selected upstream channels. The MAC scheduler also internally generates what is referred to as an initial ranging time marker, which specifies the precise time of the next initial ranging slot allocation for that upstream channel. More specifically, the initial ranging time marker specifies that the next initial ranging slot must start at a specific time $T_1$, and the MAC scheduler is configured to communicate this information to the MAP generating device ahead of time so that the MAP generating device is able to generate a channel MAP message which includes an initial ranging slot allocation at the precise time specified by the MAC scheduler.

In accordance with a specific embodiment of the present invention, as illustrated in FIGS. 5 and 6, for example, an optimized lookahead time value is used for generating channel MAP messages (for one or more upstream channels) which do not include an initial ranging slot allocation. However, any MAP message which includes an initial ranging slot allocation is generated and broadcast according to a relaxed lookahead time value which is based upon a worst case propagation delay scenario (described above).

Generally, according to the specific embodiment of FIGS. 5 and 6, the specific time corresponding to the next initial ranging marker is compared against the current time value at the Head End. When the difference between these two values reaches a predetermined value, all remaining mini slots up to the initial ranging mini slot time marker are included in one long MAP message and sent downstream. Immediately thereafter, the initial ranging mini slot MAP message is transmitted using a "relaxed" lookahead time value, which preferably enables a farthest possible cable modem on the selected upstream channel to receive and process the MAP message and initiate initial ranging procedures with the CMTS.

FIG. 6 shows a flow diagram of a Lookahead Timing Adjustment procedure 600 in accordance with a specific embodiment of the present invention. FIG. 5 shows a timing diagram illustrating how various channel MAP messages are generated in accordance with the Lookahead Timing Adjustment procedure of FIG. 6.

The Lookahead Timing Adjustment procedure 600 of FIG. 6 will now be described with reference to the timing illustration shown in FIG. 5. Generally, the Lookahead Timing Adjustment procedure 600 may be implemented at the Head End of the cable network (e.g. CMTS) for controlling the lookahead time value used for generating MAP messages on selected upstream channels. According to the specific embodiment of FIGS. 5 and 6, channel MAP messages which include at least one initial ranging slot allocation are generated using a "relaxed" LAT value, which is a predetermined, fixed value based upon a worst case propagation delay scenario, and MAP messages which do not include an initial ranging slot allocation are generated using an "optimized" LAT value which may be calculated, for example, using the LAT Optimization procedure 400 of FIG. 4.

FIG. 5 illustrates a relationship between two time lines in accordance with a specific embodiment of the present invention. A first time line 510 represents the current time at the Head End. The second time line 520 represents a future MAP scheduling time corresponding to future slot allocations which will be allocated on the selected upstream channel. Generally, as shown in FIG. 5, upstream channel MAPs A, B, C, and E do not include initial ranging slot allocations, and are therefore generated using an optimized LAT value (LAT[opt]). However, as illustrated in FIG. 5, MAP D includes an initial ranging slot allocation (which, in a specific embodiment corresponds to the entire MAP D message). Accordingly, MAP D is generated by the MAP generating device using the relaxed LAT value (e.g. MAX_LAT[relax]).

When the CMTS determines that it is time to generate a new MAP message for a selected upstream channel, it signals the MAP generating device well ahead of the start allocation time for the new MAP message to thereby cause the MAP generating device to "wake up" and begin generating the new channel MAP message. In accordance with a specific embodiment, the Lookahead Timing Adjustment procedure 600 may be initiated before the new MAP message is to be generated in order to determine the appropriate LAT value to be used (e.g. optimize LAT value or relaxed LAT value) for generating the new MAP message. Thus, referring to FIG. 5, for example, before the CMTS signals the MAP generating device to begin generating MAP A at time T1 the Lookahead Timing Adjustment procedure 600 is initiated in order to determine the appropriate LAT value to be used for generating MAP A.

Applying the Lookahead Timing Adjustment procedure of FIG. 6 to the timeline example of FIG. 5, at 602, a relaxed LAT value (e.g. MAX_LAT[relax]) is calculated using a maximum allowed propagation delay value based upon a worst case scenario (e.g. 100 miles). The relaxed value may be calculated, for example, using equation (1) above. Further, it is preferable to increase the relaxed LAT value by an additional amount equivalent to the time value associated with the length of at least one MAP cycle (e.g. 2 milliseconds) in order to ensure that a time valid MAP is received by a farthest possible cable modem on the selected upstream channel. Thus, for example, the maximum LAT value may be set equal to 8 milliseconds (to account for all inherent delays in the network described previously) plus an additional 2 milliseconds (to account for at least one MAP cycle), making a total of 10 milliseconds. Although it is possible for the MAX_LAT[relax] value to be greater than 10 milliseconds, it will be appreciated by one having skill in the art that upstream packet performance decreases as the LAT value is increased.

At 604, the variable IR_START is set equal to the start allocation time of the next initial ranging slot to be allocated on the selected upstream channel. In a specific embodiment, the start allocation time of the next initial ranging slot allocation may be obtained from a MAC scheduler at the CMTS. In the example of FIG. 5, the next initial ranging slot has a start allocation time equal to SAT4 (or IR_START).

When the CMTS determines that it is time to generate a new MAP message for the selected upstream channel, the CMTS determines (606) whether the MAX_LAT[relax] value is greater than or equal to the difference between the IR_START value and the current time value at the Head End. In other words, the CMTS checks to see whether the sum of the current time value and the relaxed LAT value is greater than or equal to the start allocation time value for the next initial ranging slot allocation.

Using the embodiment of FIG. 5 as an example, the CMTS determines whether the next MAP message (e.g. MAP A) is to be generated using the optimized LAT value or the relaxed LAT value. As shown in FIG. 5, one technique for making this determination is to subtract the MAX_LAT[relax] value from the start allocation time value associated with the next initial ranging slot (SAT4), and then compare this result to the current time value at the Head End. The time value which is derived by subtracting the MAX_LAT[relax] value from the SAT 4 value is represented by time T3 on time line 510 of FIG. 5.

Before generating MAP A, the CMTS executes block 606 of the Lookahead Timing Adjustment procedure 600. In doing so, the CMTS checks the current time value at the Head End (which will be a time value earlier than time T1), and determines that the current time value at the Head End is less than the time value at T3. Accordingly, as shown at 610 of FIG. 6, a standard length MAP, MAP A, will be generated using the optimized LAT value. In a specific embodiment, the "standard" MAP length is about 2 milliseconds. In the example of FIG. 5, for example, MAPs A, B, D, and E are each generated to have a standard MAP length, and MAP C is generated to have a special MAP length (described below). It will be appreciated that the "standard" MAP length may differ according to specific system or network configurations.

When the time comes for generating MAP B, the CMTS initiates the Lookahead Timing Adjustment procedure once again to determine whether MAP B should be generated using the optimized LAT value or the relaxed LAT value. In a specific embodiment, the Lookahead Timing Adjustment procedure for MAP B may commence at block 606 since the IR_START and MAX_LAT[relax] values have already been determined during the Lookahead Timing Adjustment procedure cycle of MAP A. Since MAP B is to be generated at or before time T2 (which is less than time T3), the CMTS will determine that MAP B is to be generated using the optimized LAT value.

When the CMTS determines that it is time to generate MAP C, the Lookahead Timing Adjustment procedure is once again initiated. In the example of FIG. 5, it is assumed that the Lookahead Timing Adjustment procedure is initiated at some time between T3 and T3a. Thus, the expression in block 606 of FIG. 6 will evaluate to true. That is, the CMTS will determine that the current time value is greater than the T3 time value. Accordingly, at 612, a special length MAP, MAP C, will be generated using the optimized LAT value. In a specific embodiment of the present invention, MAP C will include all future slot allocations which occur between SAT3 and SAT4 (inclusive of SAT3 and exclusive of SAT4). Thus, as shown in FIG. 5, MAP C is considered to be "special" since the cumulative time length of MAP C (e.g. about 10 milliseconds) is significantly greater than the cumulative time length of normal or standard MAP messages (e.g. about 2 milliseconds). As shown in FIG. 5, for example, MAPC is generated at time T3a using the optimized LAT value.

Immediately after MAP C has been generated, as described in block 614 of FIG. 6, a next MAP (i.e. MAP D) is generated which includes at least one initial ranging slot. Further, as shown in FIG. 5, MAP D is generated using the relaxed LAT value, and has a standard MAP length. Thus, as shown in FIG. 5, MAP D (having a start allocation of SAT4) is generated at time T3b using the relaxed LAT value.

It will be appreciated that one difference between conventional MAP generating techniques and the technique of the present invention described, for example, in FIGS. 5 and 6 of the drawings is the fact that MAPs C and D are both generated during the same MAP wake-up cycle. In conventional systems, after the MAP generating device has generated a particular MAP message, the device sleeps until it is time to generate a new MAP message. When the time occurs to generate a new MAP message, the MAP generating device wakes up, generates the next MAP message, and then goes back to sleep. Thus, according to conventional techniques, a single MAP message is typically generated during a single MAP wake-up cycle. However, in accordance with the embodiment described in FIGS. 5 and 6, a plurality of MAP messages (e.g. MAPs C, D) are generated during a single MAP wake-up cycle.

After MAP D has been generated, the MAP generating device may wait in an idle state until it is time to generate MAP E. When the time comes for generating MAP E, the Lookahead Timing Adjustment procedure is initiated to determine the proper LAT value to be used. In a specific embodiment, the Lookahead Timing Adjustment procedure for MAP E may commence at block 604 since the maximum LAT value has been previously determined. As shown in FIG. 5, MAP E does not include an initial ranging slot. Therefore, MAP E will be generated using the optimized LAT value. It will be appreciated, however, that the optimized LAT value may have been updated to reflect a new farthest on-line modem on the upstream channel.

CMTS Configurations

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the methods of the present invention are implemented in software such as an operating system or in an application running on an operating system.

A software or software/hardware hybrid system of this invention is preferably implemented on a general-purpose programmable machine selectively activated or reconfigured by a computer program stored in memory. Such a programmable machine may be a network device designed to handle network traffic. Such network devices typically have multiple network interfaces. One important class of device that may be used to implement the present invention is the cable modem termination system. Preferably, the CMTS is a "routing" CMTS, which handles at least some routing functions. Alternatively, the CMTS may be a "bridging" CMTS, which handles only lower-level tasks.

Figure 7:
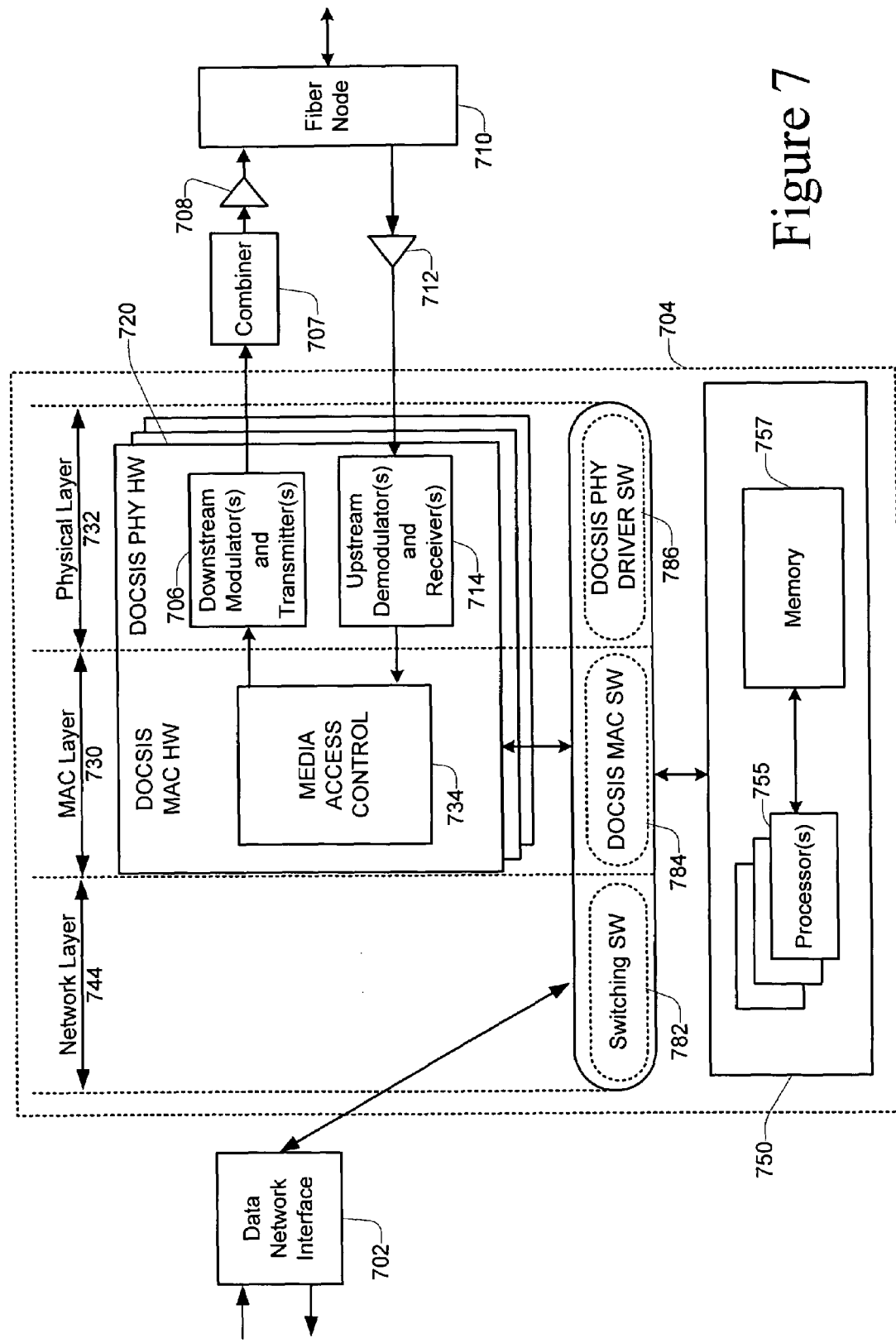
FIG. 7 shows a schematic block diagram of a specific embodiment of a cable modem termination system (CMTS), which may be used for implementing the technique of the present invention.

FIG. 7 provides an example of some components of a CMTS that may be used to implement certain aspects of this invention. In the specific embodiment as shown in FIG. 7, a CMTS 704 provides functions on three network layers including a physical layer 732, a Media Access Control (MAC) layer 730, and a network layer 744. Generally, the physical layer is responsible for receiving and transmitting RF signals on the cable plant. Hardware portions of the physical layer include a downstream modulator and transmitter 706 and an upstream demodulator and receiver 714. The physical layer also includes software 786 for driving the hardware components of the physical layer.

Upstream optical data signals (packets) arriving via an optical fiber node 710 are converted to electrical signals by a receiver 712. Next, the upstream information packet (RF electrical signals) is demodulated by the demodulator/receiver 714 and then passed to MAC layer block 730. A primary purpose of MAC layer 730 is to encapsulate, with MAC headers, downstream packets and decapsulate, of MAC headers, upstream packets. In one embodiment, the encapsulation and decapsulation proceed as dictated by the above-mentioned DOCSIS standard for transmission of data or other information. The MAC headers include addresses to specific modems or to the CMTS (if sent upstream) by a MAC layer block 730 in CMTS 704. Note that the cable modems also include MAC addressing components. In the cable modems, these components encapsulate upstream data with a header containing the MAC address of the CMTS.

MAC layer block 730 includes a MAC hardware portion (e.g. MAC controller) 734 and a MAC software portion 784, which together serve the above-described functions. Additionally the MAC hardware portion 734 and/or MAC software portion 784 may be configured or designed to implement the functions of the MAC scheduler and MAP generating device. In a preferred embodiment, MAC hardware portion 734 is distinct from the router's general-purpose microprocessor and is dedicated to performing some MAC layer functions.

In specific CMTS configurations, the hardware portions of the physical layer 732 and MAC layer 730 reside on a physical line card 720 within the CMTS. The CMTS may include a plurality of distinct line cards which service particular cable modems in the network. Each line card may be configured to have its own unique hardware portions of the physical layer 732 and MAC layer 730.

After MAC layer block 730 has processed the upstream information, it is then passed to network layer block 734. Network layer block 734 includes switching software 782 for causing the upstream information packet to be switched to an appropriate data network interface on data network interface 702. When a packet is received at the data network interface 702 from an external source, the switching software within network layer 734 passes the packet to MAC layer 730. MAC block 704 then transmits information via a one-way communication medium to downstream modulator and transmitter 706. Downstream modulator and transmitter 706 takes the data (or other information) in a packet structure and converts it to modulated downstream frames, such as MPEG or ATM frames, on the downstream carrier using, for example, QAM 64 modulation (other methods of modulation can be used such as CDMA (Code Division Multiple Access) OFDM (Orthogonal Frequency Division Multiplexing), FSK (FREQ Shift Keying)). The return data is likewise modulated using, for example, QAM 16 or QSPK. Data from other services (e.g. television) is added at a combiner 707. An optical converter 708 converts the modulated RF electrical signals to optical signals that can be received and transmitted via Fiber Node 710 to the cable modem hub.

Note that alternate embodiments of the CMTS (not shown) may not include network layer 734. In such embodiments, a CMTS device may include only a physical layer and a MAC layer, which are responsible for modifying a packet according to the appropriate standard for transmission of information over a cable modem network. The network layer 734 of these alternate embodiments of CMTS devices may be included, for example, as part of a conventional router for a packet-switched network. In a specific embodiment, the network layer of the CMTS is configured as a cable line card coupled to a standard router that includes the physical layer block 732 and MAC layer block 730. Using this type of configuration, the CMTS is able to send and/or receive IP packets to and from the data network interface 702 using switching software block 782.

The data network interface 702 is an interface component between external data sources and the cable system. The external data sources transmit data to the data network interface 702 via, for example, optical fiber, microwave link, satellite link, or through various media. The data network interface includes hardware and software for interfacing to various networks such as, for example, Ethernet, ATM, frame relay, etc.

As shown in FIG. 7, CMTS 704 includes a central hardware block 750 including one or more processors 755 and memory 757. These hardware components interact with software and other hardware portions of the various layers within the CMTS. They provide general purpose computing power for much of the software. Memory 757 may include, for example, I/O memory (e.g. buffers), program memory, shared memory, etc. The data structures described in this application may reside in such memory. Hardware block 750 may physically reside with the other CMTS components. In one embodiment, the software entities 782, 784, and 786 are implemented as part of a network operating system running on hardware 750. Preferably, at least a part of the MAP lookahead timing optimization functions of this invention are implemented in software as part of the operating system. In FIG. 7, such software may be part of MAC layer software 784 and/or the switching software 782, or may be closely associated therewith. Of course, the MAP lookahead timing optimization logic could reside in hardware, software, or some combination of the two.

The procedures employed by the CMTS during registration and pre-registration are preferably performed at the MAC layer of the CMTS logic. Thus, in CMTS 704, most of the registration operations would be performed by the hardware and software provided for MAC layer logic 730.

The operations associated with obtaining an IP address for cable modems are preferably implemented at the network layer level 734. As noted, this may involve the CMTS communicating with a DHCP server via data network interface 702, for example.

The lookahead timing optimization techniques of the present invention may be implemented on various general purpose cable modem termination systems. In a specific embodiment, the systems of this invention may be specially configured CMTSs such as, for example, specially configured models in the uBR-7200 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Although the system shown in FIG. 7 represents one specific CMTS architecture of the present invention, it is by no means the only CMTS architecture on which the present invention can be implemented. For example, other types of interfaces and media could also be used with the CMTS.

Regardless of network device's configuration (for cable plants or otherwise), it may employ one or more memories or memory modules (e.g., memory 757) configured to store program instructions for the network operations and other functions of the present invention described herein. The program instructions may specify an operating system and one or more applications, for example. Such memory or memories may also be configured to store data structures or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

It will be appreciated by one having ordinary skill in the art that the technique of the present invention may be implemented in any computer network having a standardized protocol for utilizing a central termination system (e.g. Head End) to schedule time slots for remote stations or nodes on a return (or upstream) channel. In wireless networks, the central termination system may be referred to as a Head End or wireless base station. In satellite networks, the central termination system may be referred to as a master controlling station.

Other Embodiments

While the discussion to this point has focused on MAP lookahead timing optimization techniques for cable networks, the technology of the present invention may be applied to any access or shared-access network having a plurality of hosts or nodes which share at least one channel for communicating with at least one "head-end" in the network. Examples of shared-access networks include, in addition to cable networks, wireless networks, Ethernet, FastEthernet, GigabitEthernet, LANs, etc. In the cable network, the plurality of nodes represents a plurality of cable modems that communicate with at least one CMTS at the centralized termination system using at least one shared-access upstream and downstream channel.

In general, the methods and apparatus described above may be implemented on a traffic handling device (e.g., a router) for providing MAP lookahead timing optimization in a network having at least one traffic handling device (e.g., another router) that provides normal service to a host. In the wireless system (e.g., represented by FIG. 8) the plurality of nodes or hosts corresponds to the plurality of wireless nodes 850 which use at least one shared access channel to communicate with at least one access control system 822 located at the Head End of the wireless system.

Figure 8:
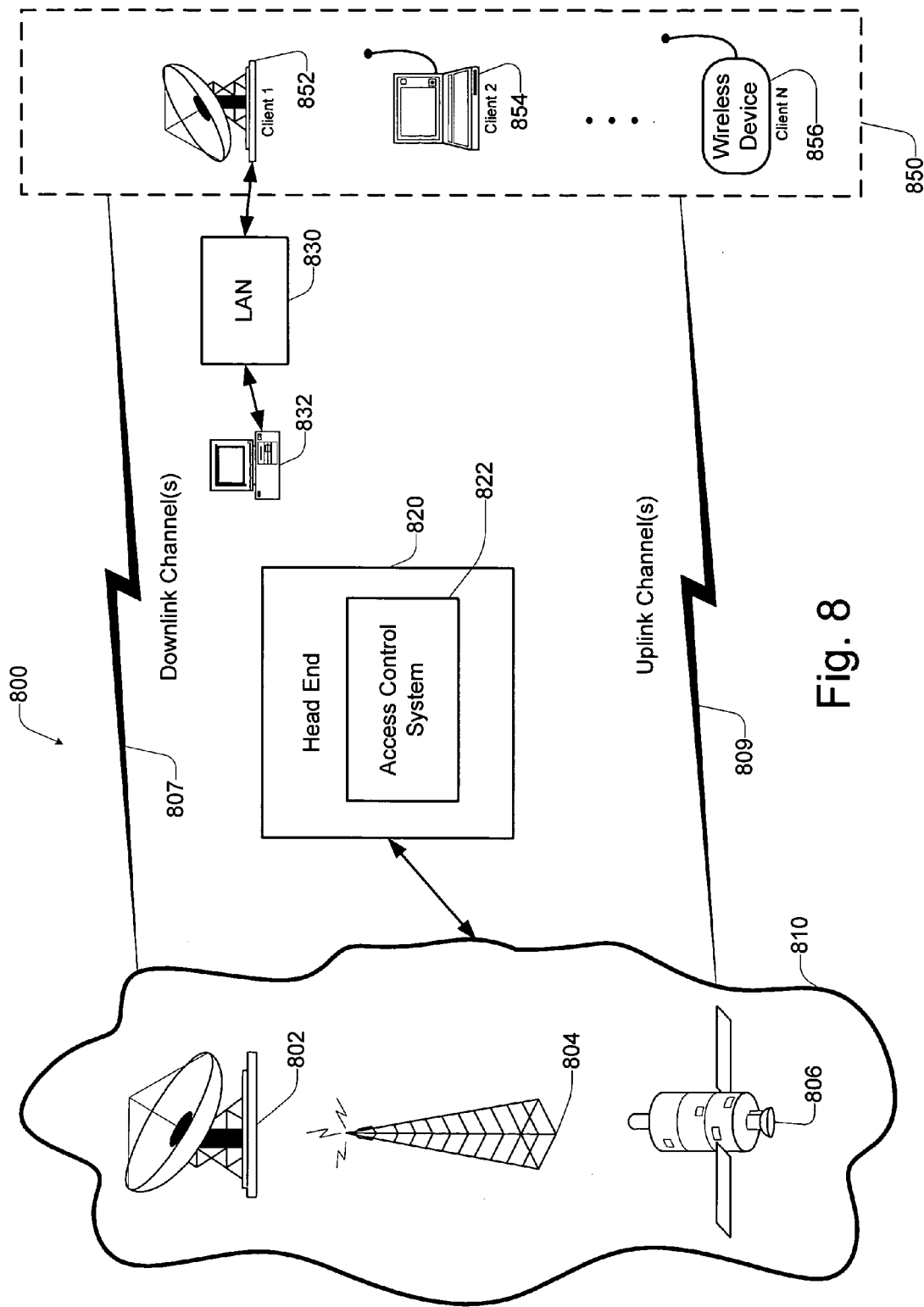
FIG. 8 shows a block diagram of a specific embodiment of a wireless network which may be used for implementing technique of the present invention.

As shown in FIG. 8, the wireless system includes a central termination system (or Head End) 820. The Head End includes an access controller or access control system (ACS) 822 which communicates with a plurality of wireless nodes 850, and coordinates access between each of the wireless nodes and the Head End 820. The access controller 822 may include memory and at least one processor. In a specific embodiment, the function of the access controller 822 is analogous to that of the CMTS described above with respect to cable modem networks. It may serve as a router as well.

The Head End 820 communicates with a plurality of wireless nodes 850 via any one of a plurality of wireless transmitting and receiving devices 810. As shown in FIG. 8, for example, the plurality of wireless transmitting and receiving devices 810 may include satellite base station 802, orbital satellites 806, radio towers 804, etc.

In a specific embodiment which is analogous to that of cable modem networks, the Head End 820 of the wireless computer system communicates with the plurality of nodes 850 via one or more downlink channels 807 and one or more uplink channels 809. Each downlink channel 807 is a broadcast-type channel utilized by the Head End to communicate with an associated group of wireless nodes within the wireless network. The uplink channel 809 is a shared-access channel, which is utilized by a group of wireless nodes (analogous to cable modems) to communicate with the Head End 820. The access controller 822 stores registration parameters for the various nodes that it services. It may also store the IP addresses for nodes that it services.

In a specific embodiment of the present invention, the registration process and information is similar to that of the cable network CMTSs described above. Moreover, the technique of the present invention for optimizing MAP lookahead timing over a shared access data network may be implemented in wireless system 800.

The wireless devices or nodes 850 may include any one of a number of wireless transmitting/receiving devices. For example, a satellite disk 852 may be used to communicate with the Head End 820 via the uplink and downlink channels. The satellite dish may, in turn, be connected to a local area network (LAN) 830 which, may be further connected to one or more computer systems 832. Another wireless device may be a portable/wireless computer system 854, which is able to transmit and receive information to the Head End via uplink and downlink channels 807 and 809. Other wireless devices 856 may include, for example, wireless telephones, handheld computing devices, etc.

In specific embodiments where the uplink and downlink channels within the wireless system 800 are utilized in a manner similar to that of the upstream and downstream channels of a cable modem network, the above-described MAP lookahead timing optimization techniques may easily be implemented in wireless system 800 using the detailed description of the present invention provided herein. Moreover, the technique of the present invention may be easily implemented in any computer network which uses shared access channels for communicating between a centralized computing system and one or more remote nodes.

Although several preferred embodiments of this invention have been described in detail herein with reference to the accompanying drawings, it is to be understood that the invention is not limited to these precise embodiments, and at various changes and modifications may be effected therein by one skilled in the art without departing from the scope of spirit of the invention as defined in the appended claims.

It is claimed:

1. A method for improving packet performance in an access network, the method comprising:
   obtaining propagation delay data associated with at least a portion of a plurality of nodes in an access network including an access control system associated with a headend using at least one upstream channel, the propagation delay data for a node being obtained from ranging procedures performed between the access control system and the node;
   dynamically adjusting a lookahead time value associated with generating MAP messages for the at least one upstream channel using the propagation delay data to determine an optimized lookahead time; and
   periodically switching between using the optimized lookahead time and a relaxed lookahead time for generating MAP messages, wherein the relaxed lookahead time is determined using worst case estimates, wherein newly introduced nodes are operable to drop MAP messages having an optimized lookahead time and respond to MAP messages having a relaxed lookahead time.

2. The method of claim 1 further comprising determining a minimum propagation delay value corresponding to a farthest on-line node on the at least one upstream channel;
   wherein the dynamic adjustment of the lookahead time value includes calculating the lookahead time value using the minimum propagation delay value.

3. The method of claim 2 wherein said minimum propagation delay value is a maximum runtime propagation delay value of said propagation delay data for the at least one upstream channel.

4. The method of claim 2 wherein the lookahead time value is calculated by adding together a plurality of delay aspects of the network, said plurality of delay aspects including:
   a MAP construction delay at the head end;
   an interleaver delay;
   the minimum propagation delay, expressed in terms of a round-trip delay;
   and a MAP processing delay at a network node.

5. The method of claim 2 further comprising:
   determining a first propagation delay value associated with a first node on the at least one upstream channel;
   comparing the first propagation delay value to a stored propagation delay value; and
   if the first propagation delay value is greater than the stored propagation delay value, replacing the stored propagation delay value with the first propagation delay value.

6. The method of claim 2 wherein determining the minimum propagation delay value comprises:
   determining a respective propagation delay value for each node on the at least one upstream channel which initiates a ranging procedure with the control access system;
   comparing each of the propagation delay values in order to determine a largest propagation delay value; and
   assigning the largest propagation delay value as the minimum propagation delay value for the at least one upstream channel.

7. The method of claim 1 wherein said access network is a cable network, said plurality of nodes are cable modems, wherein said access control system is a Cable Modem Termination System (CMTS), and wherein said propagation delay data corresponds to offset data obtained during ranging procedures between a cable modem and the CMTS.

8. The method of claim 1 wherein said access network is a wireless network.

9. The method of claim 1 wherein said ranging procedure is an initial ranging procedure performed between the node and the access control system.

10. The method of claim 1 wherein said ranging procedure is a periodic ranging procedure performed between the node and the access control system.

11. The method of claim 6 further comprising storing the propagation delay data associated with each on-line modem on the at least one upstream channel in a data structure at the head end.

12. The method of claim 11 further comprising re-calculating the minimum propagation delay value using at least a portion of the stored propagation delay values, wherein the re-calculation of the minimum propagation delay value is triggered by an occurrence of an event.

13. The method of claim 12 wherein said event is a farthest on-line node on the at least one upstream channel switching to a different upstream channel.

14. The method of claim 12 wherein said event is a farthest on-line node on the at least one upstream channel going off-line.

15. The method of claim 1 further comprising:
   determining a minimum propagation delay value corresponding to a farthest on-line node on the at least one upstream channel;
   calculating a minimum lookahead time value using the minimum propagation delay value; and
   using said minimum lookahead time value for generating channel MAP messages which do not include initial ranging slot allocations.

16. The method of claim 15 further comprising:
   calculating a second lookahead time value using a maximum propagation delay value, said propagation delay value being based upon a maximum allowed distance between a node and the Head End of the access network; and
   using said second lookahead time value for generating channel MAP messages which include at least one initial ranging slot.

17. A Head End of an access network, the access network comprising a plurality of nodes, the access network including at least one downstream channel used by the Head End to communicate with a first plurality of the network nodes, and at least one shared-access upstream channel used by the first plurality of nodes to communicate with the Head End, the Head End comprising:

a source providing a current time reference; and a MAP generating device configured or designed to generate MAP messages of future slot allocations on the at least one upstream channel, each MAP message specifying a specific, future allocation start time (SAT) for that particular MAP message;

the Head End being configured or designed to determine the SAT for each MAP message by adding a Lookahead Time (LAT) value to a current time value obtained while the MAP message is being generated;

the Head End being further configured or designed to obtain propagation delay data associated with at least a portion of the plurality of nodes using the at least one upstream channel, the propagation delay data for a node being obtained from ranging procedures performed between the Head End and the node;

the Head End being further configured or designed to use the propagation delay data to dynamically adjust the Lookahead Time value associated with the generating of MAP messages for the at least one upstream channel to determine an optimized Lookahead Time, wherein the Head End periodically switches between using the optimized Lookahead Time and a relaxed Lookahead Time, wherein newly introduced nodes are operable to drop MAP messages having an optimized Lookahead Time and respond to MAP messages having a relaxed Lookahead Time.

18. The Head End of claim 17, wherein the Head End is further configured or designed to determine a minimum propagation delay value corresponding to a farthest on-line node on the at least one upstream channel; and wherein the Head End is further configured or designed to calculate the Lookahead Time value using the minimum propagation delay value.

19. The Head End of claim 18 wherein said minimum propagation delay value is a maximum runtime propagation delay value of said propagation delay data for the at least one upstream channel.

20. The Head End of claim 17 wherein the Head End further includes memory configured to store a minimum propagation delay value corresponding to a farthest on-line node on the at least one upstream channel.

21. The Head End of claim 20 wherein said memory is further configured to store an optimized LAT value, said optimized LAT value being derived from said minimum propagation delay value.

22. The Head End of claim 18, wherein said Head End is further configured or designed to:

determine a first propagation delay value associated with a first node on the at least one upstream channel;

compare the first propagation delay value to a stored propagation delay value; and replace the stored propagation delay value with the first propagation delay value, if the first propagation delay value is greater than the stored propagation delay value.

23. The Head End of claim 18 wherein said Head End is further configured or designed to:

determine a respective propagation delay value for each node on the at least one upstream channel which initiates a range procedure with the control access system;

compare each of the propagation delay values in order to determine a largest propagation delay value; and assign the largest propagation delay value as the minimum propagation delay value for the at least one upstream channel.

24. The Head End of claim 17 wherein said access network is a cable network, said plurality of nodes are cable modems, wherein said Head End includes a Cable Modem Termination System (CMTS), and wherein said propagation delay data corresponds to offset data obtained during ranging procedures between a cable modem and the CMTS.

25. The Head End of claim 17 wherein said access network is a wireless network.

26. The Head End of claim 17 wherein said ranging procedure is an initial ranging procedure performed between the node and the Head End.

27. The Head End of claim 17 wherein said ranging procedure is a periodic ranging procedure performed between the node and the Head End.

28. The Head End of claim 23, wherein the Head End is further configured or designed to store the propagation delay data associated with each on-line modem on the at least one upstream channel in a data structure at the Head End.

29. The Head End of claim 28, wherein the Head End is further configured or designed to re-calculate the minimum propagation delay value using at least a portion of the stored propagation delay values in response to a detection of an event occurrence.

30. The Head End of claim 29 wherein said event is a farthest on-line node on the at least one upstream channel switching to a different upstream channel.

31. The Head End of claim 29 wherein said event is a farthest on-line node on the at least one upstream channel going off-line.

32. The Head End of claim 17 wherein the Head End is further configured or designed to determine a minimum propagation delay value corresponding to a farthest on-line node on the at least one upstream channel, and calculate a minimum Lookahead Time value using the minimum propagation delay value; and wherein the MAP generating device is further configured or designed to use said minimum Lookahead Time value for generating channel MAP messages which do not include initial ranging slot allocations.

33. The Head End of claim 32 wherein the Head End is further configured or designed to calculate a second Lookahead Time value using a maximum propagation delay value, said maximum propagation delay value being based upon a maximum allowed distance between a node on the at least one upstream channel and the Head End of the access network; and wherein the MAP generating device is further configured or designed to use said second Lookahead Time value for generating channel MAP messages which include at least one initial ranging slot.

34. A computer program product for improving performance of an access network, the access network comprising a Head End and a plurality of nodes, the Head End including an access control system and a current time reference source, the access network including at least one downstream channel used by the Head End to communicate with a first plurality of the network nodes, and at least one shared-access upstream channel used by the first plurality of nodes to communicate with the Head End, the access control system including a MAP generating device for generating MAP messages of future slot allocations on the at least one upstream channel, each MAP message specifying a specific, future allocation start time (SAT) for that particular MAP message, the SAT for each MAP message being determined by adding a Lookahead Time (LAT) value to a current time value obtained while the MAP message is being generated, the computer program product comprising:

a computer usable medium having computer readable code embodied therein, the computer readable code comprising:

computer code for obtaining propagation delay data associated with at least a portion of the plurality of nodes using the at least one upstream channel, the propagation delay data for a node being obtained from ranging procedures performed between the access control system and the node;

computer code for dynamically adjusting the Lookahead Time value associated with the generating of MAP messages for the at least one upstream channel using the propagation delay data to determine an optimized Lookahead Time; and computer code for periodically switching between using the optimized Lookahead Time and a relaxed Lookahead Time for generating MAP messages, wherein the relaxed Lookahead Time is determined using worst case estimates, wherein newly introduced nodes are operable to drop MAP messages having an optimized Lookahead Time and respond to MAP messages having a relaxed Lookahead Time.

35. The computer program product of claim 34 further comprising computer code for determining a minimum propagation delay value corresponding to a farthest on-line node on the at least one upstream channel, wherein the dynamic adjustment of the Lookahead Time value includes calculating the Lookahead Time value using the minimum propagation delay value.

36. The computer program product of claim 35 wherein the computer code for determining the minimum propagation delay value comprises:

computer code for determining a respective propagation delay value for each node on the at least one upstream channel which initiates a ranging procedure with the control access system;

computer code for comparing each of the propagation delay values in order to determine a largest propagation delay value; and computer code for assigning the largest propagation delay value as the minimum propagation delay value for the at least one upstream channel.

37. The computer program product of claim 34 wherein said access network is a cable network, said plurality of nodes are cable modems, wherein said access control system is a Cable Modem Termination System (CMTS), and wherein said propagation delay data corresponds to offset data obtained during ranging procedures between a cable modem and the CMTS.

38. The computer program product of claim 34 wherein said access network is a wireless network.

39. The computer program product of claim 36 further comprising computer code for storing the propagation delay data associated with each on-line modem on the at least one upstream channel in a data structure at the Head End.

40. The computer program product of claim 39 further comprising computer code for re-calculating the minimum propagation delay value using at least a portion of the stored propagation delay values, wherein the re-calculation of the minimum propagation delay value is triggered by an occurrence of an event.

41. The computer program product of claim 34 further comprising:

computer code for determining a minimum propagation delay value corresponding to a farthest on-line node on the at least one upstream channel;

computer code for calculating a minimum Lookahead Time value using the minimum propagation delay value; and computer code for using said minimum Lookahead Time value for generating channel MAP messages which do not include initial ranging slot allocations.

42. The computer program product of claim 41 further comprising:

computer code for calculating a second Lookahead Time value using a maximum propagation delay value, said maximum propagation delay value being based upon a maximum allowed distance between a node and the Head End of the access network; and computer code for using said second Lookahead Time value for generating channel MAP messages which include at least one initial ranging slot.

43. A method for generating messages in an access network, the method comprising:

generating MAP messages at a Head End for an upstream channel associated with a plurality of nodes, each MAP message specifying a start allocation time determined using a lookahead time value;

obtaining propagation delay data associated with at least a portion of the plurality of nodes using the upstream channel, the propagation delay data for a node being obtained from ranging procedures performed between the Head End and the node;

dynamically adjusting the lookahead time value associated with the generating of MAP messages for the upstream channel using the propagation delay data to determine an optimized lookahead time; and switching between using the optimized lookahead time and a relaxed lookahead time for generating MAP messages, wherein the relaxed lookahead time is determined using worst case estimates, wherein newly introduced nodes are operable to drop MAP messages having an optimized lookahead time and respond to MAP messages having a relaxed lookahead time.

44. The method of claim 43, further comprising determining a minimum propagation delay value corresponding to a farthest on-line node on the upstream channel;

wherein the dynamic adjustment of the lookahead time value includes calculating the lookahead time value using the minimum propagation delay value.

45. The method of claim 44, wherein the minimum propagation delay value is a maximum runtime propagation delay value of the propagation delay data for the upstream channel.

46. The method of claim 44 wherein the lookahead time value is calculated by adding together a plurality of network delay aspects, the plurality of delay aspects comprising:

a MAP construction delay at the Head End;

an interleaver delay;

the minimum propagation delay, expressed in terms of a round-trip delay;

and a MAP processing delay at a network node.

47. The method of claim 44 further comprising:

determining a first propagation delay value associated with a first node on the at least one upstream channel;

comparing the first propagation delay value to a stored propagation delay value; and if the first propagation delay value is greater than the stored propagation delay value, replacing the stored propagation delay value with the first propagation delay value.

48. An apparatus for generating messages in an access network, the apparatus comprising:
- means for generating MAP messages for an upstream channel associated with a plurality of nodes, each MAP message specifying a start allocation time determined using a lookahead time value;
- means for obtaining propagation delay data associated with at least a portion of the plurality of nodes using the upstream channel, the propagation delay data for a node being obtained from ranging procedures performed between the Head End and the node;
- means for dynamically adjusting the lookahead time value associated with the generating of MAP messages for the upstream channel using the propagation delay data to determine an optimized lookahead time; and
- means for switching between using the optimized lookahead time and a relaxed lookahead time for generating MAP messages, wherein the relaxed lookahead time is determined using worst case estimates, wherein newly introduced nodes are operable to drop MAP messages having an optimized lookahead time and respond to MAP messages having a relaxed lookahead time.

49. The apparatus of claim 48, further comprising means for determining a minimum propagation delay value corresponding to a farthest on-line node on the upstream channel; wherein the dynamic adjustment of the lookahead time value includes calculating the lookahead time value using the minimum propagation delay value.

* * * * *